United States Patent [19]
Needle et al.

[11] Patent Number: 5,596,693
[45] Date of Patent: Jan. 21, 1997

[54] METHOD FOR CONTROLLING A SPRYTE RENDERING PROCESSOR

[75] Inventors: David L. Needle, Alameda; Robert J. Mical, Redwood City, both of Calif.

[73] Assignee: The 3DO Company, Redwood City, Calif.

[21] Appl. No.: 509,674

[22] Filed: Jul. 31, 1995

Related U.S. Application Data

[63] Continuation of Ser. No. 970,278, Nov. 2, 1992, abandoned.

[51] Int. Cl.$^6$ .................................................. G03B 21/32
[52] U.S. Cl. ........................ 395/174; 395/509; 395/513; 345/122
[58] Field of Search ........................... 395/119, 133, 395/152, 164; 345/115, 122, 133

[56] References Cited

U.S. PATENT DOCUMENTS

| | | | |
|---|---|---|---|
| 3,900,886 | 8/1975 | Coyle et al. | 358/82 |
| 4,045,798 | 8/1977 | Bristow | 340/324 AD |
| 4,149,184 | 4/1979 | Giddings et al. | 358/81 |
| 4,243,984 | 1/1981 | Ackley et al. | 340/703 |
| 4,345,244 | 8/1982 | Greer et al. | 340/728 |
| 4,418,993 | 12/1983 | Lipton | 352/57 |
| 4,471,465 | 9/1984 | Mayer et al. | 364/900 |
| 4,472,037 | 9/1984 | Lipton | 352/57 |
| 4,521,014 | 6/1985 | Sitrick | 273/1 GC |
| 4,521,770 | 6/1985 | Rhyne | 340/703 |
| 4,523,226 | 6/1985 | Lipton et al. | 358/88 |
| 4,561,659 | 12/1985 | Redfield et al. | 273/313 |
| 4,562,463 | 12/1985 | Lipton | 358/88 |
| 4,572,509 | 2/1986 | Sitrick | 273/85 G |
| 4,580,134 | 4/1986 | Campbell et al. | 340/703 |
| 4,580,782 | 4/1986 | Ochi | 273/86 R |
| 4,583,117 | 4/1986 | Lipton et al. | 358/92 |
| 4,635,516 | 1/1987 | Giannini et al. | 84/1.01 |
| 4,653,013 | 3/1987 | Collins et al. | 395/139 |
| 4,672,541 | 6/1987 | Bromley et al. | 364/410 |

(List continued on next page.)

FOREIGN PATENT DOCUMENTS

| | | | |
|---|---|---|---|
| 0329418A2 | 8/1989 | European Pat. Off. | G06F 1/04 |
| 0437630A1 | 7/1991 | European Pat. Off. | G09G 5/36 |
| 0487267A2 | 5/1992 | European Pat. Off. | H04N 9/76 |
| 83/01391 | 4/1983 | WIPO | A63F 9/22 |
| 90/15383 | 12/1990 | WIPO | G06F 9/00 |
| 90/15385 | 12/1990 | WIPO | G06F 12/00 |
| 90/15396 | 12/1990 | WIPO | G06F 15/62 |
| 90/15395 | 12/1990 | WIPO | G06F 15/62 |
| 90/15381 | 12/1990 | WIPO | G06F 3/153 |
| 91/02308 | 2/1991 | WIPO | G06F 9/44 |
| 91/02309 | 2/1991 | WIPO | G06F 9/44 |
| 91/12588 | 8/1991 | WIPO | G06F 15/72 |
| 91/19272 | 12/1991 | WIPO | G06K 9/36 |
| 92/02897 | 2/1992 | WIPO | G06K 9/36 |

OTHER PUBLICATIONS

Intel Corporation, 82750DB Display Processor, Specification (Feb. 1991), pp. 1-1 thru 1-56.

Intel Corporation, 82750PB Pixel Procesor, Specification (Feb. 1991), pp. 1-57 thru 1-119.

*Primary Examiner*—Mark K. Zimmerman
*Assistant Examiner*—Cliff N. Vo
*Attorney, Agent, or Firm*—Fliesler, Dubb, Meyer & Lovejoy

[57] ABSTRACT

Linked lists of spryte control blocks are prepared in memory and traversed by a spryte rendering engine. Each spryte control block controls the rendering of a respective spryte into the display buffer, and contains such information as a pointer to source data for the corresponding spryte, positional and incrementing specifications for a destination quadrilateral, a control word for manipulations to be performed on the spryte image source data, and an indication of which of several available formats the spryte image source data is packed in. Once the linked list is prepared, the spryte rendering engine can be called by writing certain values into specific memory-mapped hardware registers, and then writing dummy data to an address recognized by the hardware as a command to initiate the spryte rendering operation.

34 Claims, 5 Drawing Sheets

U.S. PATENT DOCUMENTS

| | | | |
|---|---|---|---|
| 4,674,051 | 6/1987 | Fischer | 364/443 |
| 4,731,848 | 3/1988 | Kendall et al. | 381/63 |
| 4,754,270 | 6/1988 | Murauchi | 340/731 |
| 4,771,279 | 9/1988 | Hannah | 340/801 |
| 4,772,882 | 9/1988 | Mical | 340/709 |
| 4,792,850 | 12/1988 | Liptoh et al. | 358/92 |
| 4,817,149 | 3/1989 | Myers | 381/1 |
| 4,824,106 | 4/1989 | Ueda et al. | 273/1 E |
| 4,827,249 | 5/1989 | Chauvel et al. | 340/703 |
| 4,847,604 | 7/1989 | Doyle | 340/706 |
| 4,847,608 | 7/1989 | Bouron | 340/747 |
| 4,857,901 | 8/1989 | Lathrop | 340/703 |
| 4,864,289 | 9/1989 | Nishi et al. | 340/725 |
| 4,879,676 | 11/1989 | Hansen | 364/748 |
| 4,884,876 | 12/1989 | Lipton et al. | 350/347 E |
| 4,905,168 | 2/1990 | McCarthy et al. | 395/152 |
| 4,908,858 | 3/1990 | Ohno | 381/1 |
| 4,918,434 | 4/1990 | Ueda et al. | 340/703 |
| 4,918,436 | 4/1990 | Johary | 340/799 |
| 4,931,751 | 6/1990 | Keller et al. | 332/108 |
| 4,939,672 | 7/1990 | Meadows | 364/521 |
| 4,951,038 | 8/1990 | Yamamura | 340/725 |
| 4,951,229 | 8/1990 | DiNicola et al. | 340/725 |
| 4,951,230 | 8/1990 | Dalrympie et al. | 364/521 |
| 4,951,232 | 8/1990 | Hannah | 364/522 |
| 4,952,051 | 8/1990 | Lovell et al. | 340/725 |
| 4,953,073 | 8/1990 | Moussouris et al. | 364/200 |
| 4,959,779 | 9/1990 | Weber et al. | 364/200 |
| 4,960,384 | 10/1990 | Singer et al. | 439/155 |
| 4,967,268 | 10/1990 | Lipton et al. | 358/92 |
| 4,969,647 | 11/1990 | Mical et al. | 273/85 G |
| 4,974,187 | 11/1990 | Lawton | 364/728.01 |
| 4,979,033 | 12/1990 | Stephens et al. | 358/92 |
| 4,982,342 | 1/1991 | Moribe et al. | 364/518 |
| 4,988,892 | 1/1991 | Needle | 307/269 |
| 5,014,134 | 5/1991 | Lawton et al. | 358/261.3 |
| 5,027,270 | 6/1991 | Riordan et al. | 364/200 |
| 5,046,097 | 9/1991 | Lowe et al. | 381/17 |
| 5,051,737 | 9/1991 | Akeley et al. | 340/747 |
| 5,063,441 | 11/1991 | Lipton, et al. | 358/88 |
| 5,068,911 | 11/1991 | Resnikoff et al. | 382/56 |
| 5,070,479 | 12/1991 | Nakagawa | 395/575 |
| 5,073,964 | 12/1991 | Resnikoff | 382/41 |
| 5,081,645 | 1/1992 | Resnikoff et al. | 375/1 |
| 5,091,717 | 2/1992 | Carrie et al. | 340/703 |
| 5,091,720 | 2/1992 | Wood | 340/721 |
| 5,101,446 | 3/1992 | Resnikoff et al. | 382/56 |
| 5,113,285 | 5/1992 | Franklin et al. | 359/465 |
| 5,113,490 | 5/1992 | Winget | 395/119 |
| 5,113,511 | 5/1992 | Nelson et al. | 395/425 |
| 5,121,191 | 6/1992 | Cassereau et al. | 358/13 |
| 5,125,671 | 6/1992 | Ueda et al. | 273/437 |
| 5,131,080 | 7/1992 | Fredrickson et al. | 395/164 |
| 5,155,768 | 10/1992 | Matsuhara | 380/23 |
| 5,175,815 | 12/1992 | Wada | 395/162 |
| 5,206,628 | 4/1993 | Kelleher | 340/703 |
| 5,235,677 | 8/1993 | Needle et al. | 395/131 |

METHOD FOR CONTROLLING A SPRYTE RENDERING PROCESSOR

This application is a continuation of Ser. No. 07/970,278, filed Nov. 2, 1992, now abandoned.

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

CROSS-REFERENCE TO RELATED APPLICATIONS

This application is related to:

PCT Patent Application Ser. No. PCT/US92/09349, entitled AUDIO/VIDEO COMPUTER ARCHITECTURE, by inventors Mical et al., filed concurrently herewith, and also to U.S. patent application Ser. No. 07/970,308, now abandoned, bearing the same title, same inventors and also filed concurrently herewith;

PCT Patent Application Ser. No. PCT/US92/09342, entitled RESOLUTION ENHANCEMENT FOR VIDEO DISPLAY USING MULTI-LINE INTERPOLATION, by inventors Mical et al., filed concurrently herewith, and also to U.S. patent application Ser. No. 07/970,287, now U.S. Pat. No. 5,481,275, bearing the same title, same inventors and also filed concurrently herewith;

PCT Patent Application Ser. No. PCT/US92/09348, entitled METHOD FOR GENERATING THREE DIMENSIONAL SOUND, by inventor David C. Platt, filed concurrently herewith, and also to U.S. patent application Ser. No. 07/970,274, now U.S. Pat. No. 5,337,363, bearing the same title, same inventor and also filed concurrently herewith;

PCT Patent Application Ser. No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed concurrently herewith, and also to U.S. patent application Ser. No. 07/970,289, now pending, bearing the same title, same inventors and also filed concurrently herewith;

PCT Patent Application Ser. No. PCT/US92/09460, entitled METHOD AND APPARATUS FOR UPDATING A CLUT DURING HORIZONTAL BLANKING, by inventors Mical et al., filed concurrently herewith, and also to U.S. patent application Ser. No. 07/969,994, now abandoned, bearing the same title, same inventors and also filed concurrently herewith;

PCT Patent Application Ser. No. PCT/US92/09467, entitled IMPROVED METHOD AND APPARATUS FOR PROCESSING IMAGE DATA, by inventors Mical et al., filed concurrently herewith, and also to U.S. patent application Ser. No. 07/970,083, now pending, bearing the same title, same inventors and also filed concurrently herewith; and PCT Patent Application Ser. No. PCT/US92/09384, entitled PLAYER BUS APPARATUS AND METHOD, by inventors Needle et al., filed concurrently herewith, and also to U.S. patent application Ser. No. 07/970,151, now abandoned, bearing the same title, same inventors and also filed concurrently herewith.

The related patent applications are all commonly assigned with the present application and are all incorporated herein by reference in their entirety.

DESCRIPTION OF RELATED ART

1. Field of the Invention

The invention relates generally to image data processing, and more particularly, to techniques for controlling a spryte engine to perform functions related to shadowing, highlighting and other functions, on a source image which is to be mapped and rendered onto a destination grid.

2. Description of Related Art

In recent years, the presentation and prepresentation processing of visual imagery has shifted from what was primarily an analog format to an essentially digital format. Unique problems come to play in the digital processing of image data. The problems include providing adequate storage capacity for digital image data and maintaining acceptable data throughput rates. In addition, there is the problem of creating a sense of realism in digitally generated imagery, particularly in animated imagery.

The visual realism of imagery generated by digital video game systems, simulators and the like can be enhanced by providing special effects such as shadowing, highlighting and so forth. For example, when the image of an airplane is to be displayed flying over a flat terrain on a sunny day, the realism of the overall scene is enhanced by generating a shadow image of the airplane within the image of the terrain. The effect appears more realistic when the terrain region onto which the shadow is projected becomes dimmed rather than completely blackened. The observer continues to see part of the texture of the terrain even though it is covered by the airplane's shadow. The effect is referred to as "shadowing."

Highlighting is another example of realism-imparting effects. Suppose an explosive device is displayed detonating near the airplane. Visual realism is enhanced by momentarily increasing the brightness (highlighting) of the airplane's image to create the impression that light from the explosion is reflecting off the airplane's fuselage. The effect appears more realistic when certain brightness and/or colorization relationships between different parts of the airplane (e.g., cockpit, fuselage, wings) are maintained.

Home game systems, such as the Sega "Genesis" have a two-source image merging system for creating shadowing and highlighting effects on-the-fly (in real time). When the shadow effect is desired, a first source "tile" or "sprite" (rectangular block of bit-mapped data representing the airplane shadow region) is overlaid with a second source tile representing the underlying terrain. For every pixel position where the first (shadow) sprite intensity is non-zero, a digital signal representing the corresponding terrain intensity in the second tile is cut in half to thereby produce a "dimming" effect. The dimmed version of the terrain tile is then output as part of the video image. (The dimmed image data is not stored in memory however.)

To produce the highlighting effect, the Sega "Genesis" system divides the shading value of all pixels within the airplane's sprite by two and then adds half the maximum shading value to each such pixel. This preserves the relative shading relation between parts of the airplane while making each brighter. The augmented version of the airplane tile is then output as part of the video signal, but not saved. It is not possible to both shade and highlight a tile at the same time in the Sega "Genesis™" system.

The above-described shadowing and highlighting techniques are of limited use. Optically-complex animated scenes require much more. Consider for example a scene in a Knights of the Realm kind of game. The hero enters the arch chamber of a church. Stained glass windows of different elevations, colorations, transparencies, shapes and angles surround the chamber. A villain is to be seen through the stained glass windows, approaching from the outside of the chamber at an angle relative to the stained glass windows. The scene is to be projected through, or displayed on, a two-dimensional window (hereafter, the observation plane). For added realism, the position of the observation plane (the window through which the game player views the scene) is to rotate slowly about the hero, thus giving a three-dimensional quality to the displayed two-dimensional scene.

Realistic rendering of such a scene has to take into consideration the transformation of outside light as the light passes at various angles through the stained glass windows to the observation plane. It also has to take into account the reflection of internal lighting off the stained glass windows toward the observer's plane. Moreover, if the villain throws a rock through one of the stained glass windows, the visual effects of the hole have to replace those of the removed window material. If the villain flings mud onto a window, the transparency and coloration of the affected window regions have to change accordingly.

Previously available home-game systems (e.g. Nintendo Entertainment System, Sega Genesis) were not capable of handling such optically-complex animated scenes in real time. Some commercial imaging systems such as the Silicon Graphics "Iris™" system do provide mechanisms for handling optical complexities in real time, but this is made possible only through the use of high speed computers, large memories and special custom circuitry. These commercial systems are therefore available only at very high cost.

Heretofore, a low cost system for providing realistic renditions of complex animated scenes has not been available.

Digital graphic processing also relies on the physical transformation of digital signals representing image data from one organizational format to another. Part or all of the transformed image data is then displayed on an appropriate display means (e.g., a cathode ray tube or a liquid crystal display).

In many instances, it is desirable to transform digital image data from one format to another at relatively high speed. This is done to create a sense of animation in displayed images and to create a sense of real-time responsiveness to user inputs in the case of interactive systems. Such high-speed transformation is referred to as real-time digital graphic processing. Real-time digital graphic processing is particularly useful in flight or other simulation systems, interactive game systems and the like.

One function that is often called for in real-time digital graphic processing is the mapping of a source image onto a destination surface. Typically, the source image comprises one or more pixels each of which is filled with a particular color or shade. The mapping function can be a one-to-one copying of pixels from a source area to a destination area. Or alternatively, the mapping function can include a transformation of size, and/or a change of shape (e.g., skew) and/or a rotation of some angle plus a change of colors or image brightness.

By way of example, consider a simulated scene in a real-time military game. An airplane is to be pictured on a display panel such that it appears to be flying towards or away from a viewer. The viewer controls at least part of the action on the display by way of real-time controls (e.g., a joystick). If the airplane is to be seen flying towards the viewer, its image becomes larger as its apparent distance from the viewer decreases. Conversely, if the airplane is to be seen flying away from the viewer, its image becomes smaller as its distance from the viewer increases. Moreover, if the airplane performs a roll during its flight, its image has to rotate.

If an explosive device ignites near the airplane as the airplane flies by, the displayed brightness of the aircraft body should increase momentarily to simulate reflection of light from the explosion off the fuselage of the airplane.

The airplane may have transparent components, such as a large bubble-shaped cockpit window; or a hole on part of its body, the hole being one that is suddenly created by a striking projectile. In such cases, it is desirable to show background scenery passing transparently through the cockpit window and/or body hole as the airplane flies in front of a background scene.

An animated real-time scene of this type can be produced on a display means in a number of ways.

A brute force approach would separately generate each frame of the animated scene data in its entirety, store the generated frame data in high speed memory (e.g., video RAM) and transfer each complete frame (background plus airplane) to the display means at an appropriate frame rate. This brute-force approach wastes memory space and demands high-speed performance from the processing circuitry that generates the sequential frames of image data.

A better approach relies on the concept of sprite painting. One area of memory stores nonchanging, background image data and a second area of memory stores the image data of the airplane and other moving bodies. With each displayed frame, the image of the airplane is mapped from the second memory area onto the background image of the first memory area. The mapping function changes with time to provide size enlargement or reduction and rotation over time. The mapping function also provides changes of color and/or brightness to simulate various illuminations such as that from a nearby explosion.

Ideally, it should be possible to take any source image and produce a mapping of it which includes arbitrary amounts of enlargement or reduction in size. It should be possible to project the mapped copy onto a destination grid with or without rotation and/or shape distortion (skew). It should also be possible to project the mapped copy onto a destination grid with or without changes of color.

High-performance electronic computer systems are available for transforming image data in such a manner, such as the Silicon Graphics Iris™ system mentioned above. Such systems rely on complex software-controlled data transformations and bulk transfers of image data from one memory region to another. A general purpose computing unit is burdened with the task of supporting all calculations. Unfortunately, these computer systems suffer from drawbacks such as excessive cost, large circuit size, complexity and/or slow image rendition speed.

A need exists within the industry for a compact image-rendering system that can be implemented at low cost on one or a few integrated circuit (IC) chips and can nonetheless perform high-speed complex image transformations.

A need also exists to control such an image-rendering system with a plurality of software routines or primitives which can be called by higher level routines in a logical, basically self-evident manner, so that the detailed complexities of the image-rendering system can be hidden. Such routines should also provide protection from unintentional misuse of the image-rendering system.

SUMMARY OF THE INVENTION

According to the invention, roughly described, linked lists of spryte control blocks are prepared in memory and traversed by a spryte rendering engine. Each spryte control block controls the rendering of a respective spryte into the display buffer, and contains such information as a pointer to source data for the corresponding spryte, positional and perspective specifications for a destination quadrilateral, a control word for manipulations to be performed on the spryte image source data, and an indication of which of several available formats the spryte image source data is packed in. A spryte control block can also control the spryte rendering engine to modify a portion of existing display data, using either new spryte image source data or constant data. Once the linked list is prepared, the spryte rendering engine can be called by writing certain values into specific memory-mapped hardware registers, and then writing dummy data to an address recognized by the hardware as a command to initiate the spryte rendering operation.

BRIEF DESCRIPTION OF THE DRAWINGS

The invention will be described with respect to particular embodiments thereof, and reference will be made to the drawings, in which.

DETAILED DESCRIPTION

The embodiments described herein are intended to operate on hardware systems such as that described in the related AUDIO/VIDEO COMPUTER ARCHITECTURE application the related IMPROVED METHOD AND APPARATUS FOR PROCESSING IMAGE DATA application and the related SPRYTE RENDERING SYSTEM WITH IMPROVED CORNER CALCULATING ENGINE AND IMPROVED POLYGON-PAINT ENGINE application. These applications are incorporated herein by reference, and the description of the hardware described in such applications need not be repeated here. Certain information set forth below, however, will be useful to an understanding of the present invention.

I. Overall Hardware Architecture

Figure 1:
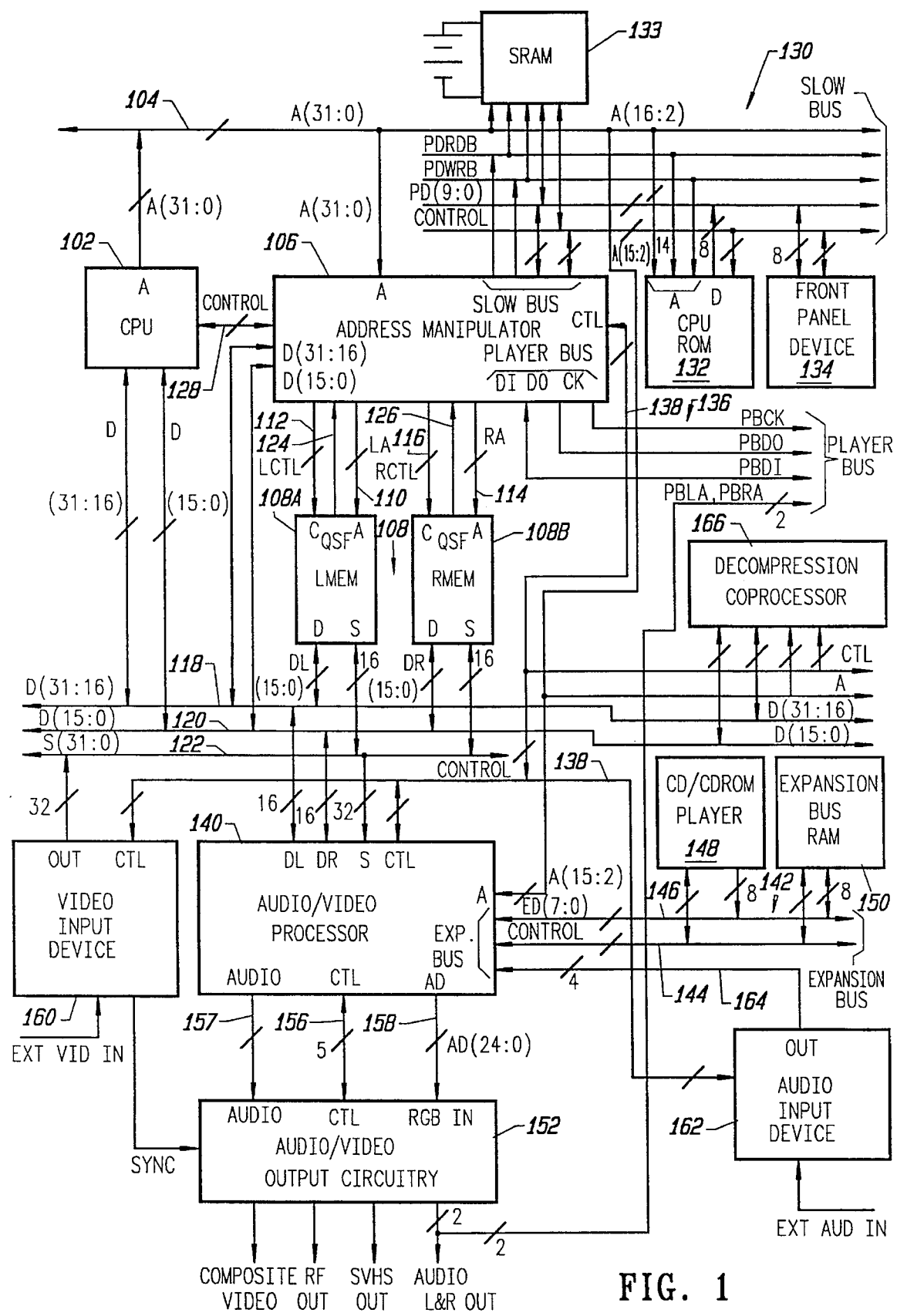
FIG. 1 is a block diagram of major components of a hardware system in which the invention may be used.

FIG. 1 is a block diagram showing major components of the hardware system. It comprises a CPU 102, which may be an ARM 60 RISC processor manufactured by Advanced RISC Machines, Ltd., Swaffham Bulbeck, Cambridge, U.K. The ARM 60 is described in Advanced RISC Machines, "ARM 60 Datasheet" (1992), incorporated herein by reference. The address bus 104, which is provided as an input to an address manipulator chip 106. The address manipulator chip 106 contains, among other things, an address generator for providing DMA-generated addresses to system memory, as well as addresses from other sources; a D-bus arbiter; two spryte engines; and interfaces to a player bus, a slow bus and a set of external processors. The address manipulator chip 106 generates addresses for system memory 108, which includes a left memory bank 108A and a right memory bank 108B. System memory is 32-bits wide, the high-order 16 bits of each 32-bit word being in left memory 108A and the low-order 16 bits being in right memory 108B. The CPU 102 addresses system memory only in words, but the address manipulator chip 106 can address each half of the memory entirely independently. Address manipulator chip 106 provides addresses and control signals to left memory 108A over an LA bus 110 and an LCTL bus 112, respectively, and provides addresses and control signals to right memory 108B over an RA bus 114 and RCTL bus 116, respectively.

System memory 108 can include one or two "sets" of video RAM (VRAM) and zero, one or two sets of DRAM. A set VRAM contains 512k bytes of left memory and 512k bytes of right memory, for a total of one megabyte. A set of DRAM is, depending on the system configuration, one, four or 16 megabytes long. As with VRAM, half of each set is located in the left bank of memory and the other half is located in the right bank of memory. However, unlike VRAM, DRAM is always accessed in full 32-bit words. System memory 108 is considered big-endian.

All of the left and right bank system memory sets receive the respective left and right half addresses generated by the address manipulator chip 106. All of the left bank sets also include a data port which are coupled bi-directionally with a left half data bus D(31:16) 118. Similarly, the data ports of all of the sets of right bank memory are coupled bi-directionally with a right half data bus D(15:0) 120. The VRAM sets also have a serial port S, which is coupled bi-directionally with an S(31:0) bus 122.

Address manipulator chip 106 also provides and receives control signals to and from the CPU 102 over lines 128, and is also coupled bi-directionally with the left and right data buses 118 and 120. Address manipulator chip 106 also interfaces to a slow bus 130, which is an 8-bit bus for accessing such devices as a CPU ROM 132, a battery-backed SRAM, and/or various front panel devices 134. It may also support additional CPU-accessible RAM, and may also support an FM sound generator device. The slow bus 130 includes 14 bits of the address bus 104 A(16:2), an 8-bit data bus PD(7:0), a PDRDB read strobe, a PDWRB write strobe, and various control lines. PDRDB and PDWRB are used to carry the two low-order address lines for accessing the 8-bit wide CPU ROM 132.

Address manipulator chip 106 also interfaces to a player bus 136, which is used to connect the system to various user input/output devices such as joysticks, 3D glasses, hand controllers and steering wheels, and and game saver cartridges. Address manipulator chip 106 is also coupled to a control bus 138, which is used to send and receive control signals to and from other processors in the system of FIG. 1.

The system of FIG. 1 further includes an audio/video processor chip 140 which is coupled bi-directionally to both halves 118 and 120 of the D-bus, and coupled to receive data from the 32-bit wide S bus 122. Audio/video processor chip 140 is also coupled to the control bus 138, and is coupled to receive address bits A(15:2) from the system address bus 104. The audio/video processor chip 140 generally includes display path circuitry, an audio subsystem, timers, an interrupt controller, an expansion bus interface and a watchdog timer. The expansion bus interface couples to an expansion bus 142 which includes control lines 144 and an 8-bit bus 146 carrying multiplexed address and data information. The expansion bus 142 supports such devices as CD/CD-ROM player 148 and optional expansion bus RAM 150. The CD/CD-ROM player 148 is built into the housing of the system of FIG. 1 and provides the primary mechanism by which software (including the routines described herein) is loaded into the system for execution on the CPU 102.

The audio/video processor 140 communicates with audio/video output circuitry 152 via audio lines 157, control lines 156, and a 12-bit AD bus 158. The audio/video output circuitry 152 generally generates the video timing and output video waveforms. It provides a composite video output, an RF output for connection to a standard television, an SVHS output, and separate left and right audio signal outputs.

The system of FIG. 1 also includes a decompression co-processor 166 which is coupled to the control bus 138, to bits A(15:2) of the system address bus 104, and to both halves 118 and 120 of the D bus. Decompression co-processor 166 is used to decompress software which is loaded into the system from the CD/CD-ROM player 148 or from another source.

A section of system memory starting at address zero and extending to either 0, 8, 16 or 32K bytes, may be defined as SYSRAM. The size selection is made by the software. The address manipulator chip 106 contains protections which prevent user software from writing to or reading from SYSRAM. Only software running in the supervisor mode of the CPU 102 may write to SYSRAM.

All of the system address and timing signals are generated by the address manipulator chip 106. Any requests for access to system memory from either the CPU 102 or the audio/video processor 140 pass through the address manipulator chip 106.

Except for the allocation of SYSRAM, and except for a 1 megabyte limitation on data structures which are expected to be shifted out the S-port of a video RAM, present only because of physical VRAM boundaries, the restrictions on where various portions of a software application may be located in system memory are minimal. In a minimum system, with only one megabyte of system memory (VRAM), the low 64k 32-bit words might contain CPU instructions and data. The next 300k bytes might contain uncompressed 8-bit image source data, and the next 172k bytes might contain audio and other data. The next 150k bytes might be allocated for one frame buffer (320 by 240 pixels by two bytes per pixel), and the last 150k bytes might be allocated for a second frame buffer.

Frame buffers are arranged so that even number data lines reside in the left memory bank and odd number data lines reside in the right memory bank. Pixels are represented as 16-bit values divided as follows: five bits to represent a red pen number, five bits to represent a green pen number, four bits to represent a blue pen number, and two subposition bits H and V. In an alternative data format, one of the H or V bits is replaced by a fifth blue pen number bit. When a pixel value is transmitted down the display path, a color look-up table translates each 4- or 5-bit pen number to an 8-bit value for the corresponding color DAC. The color look-up table can be updated prior to each scan line. Pixels are stored at a low resolution of 320 by 240 pixels per frame, and the H and V subposition bits indicate which quadrant of the low-resolution pixel area the designated color is actually considered to be located in.

Figure 2:
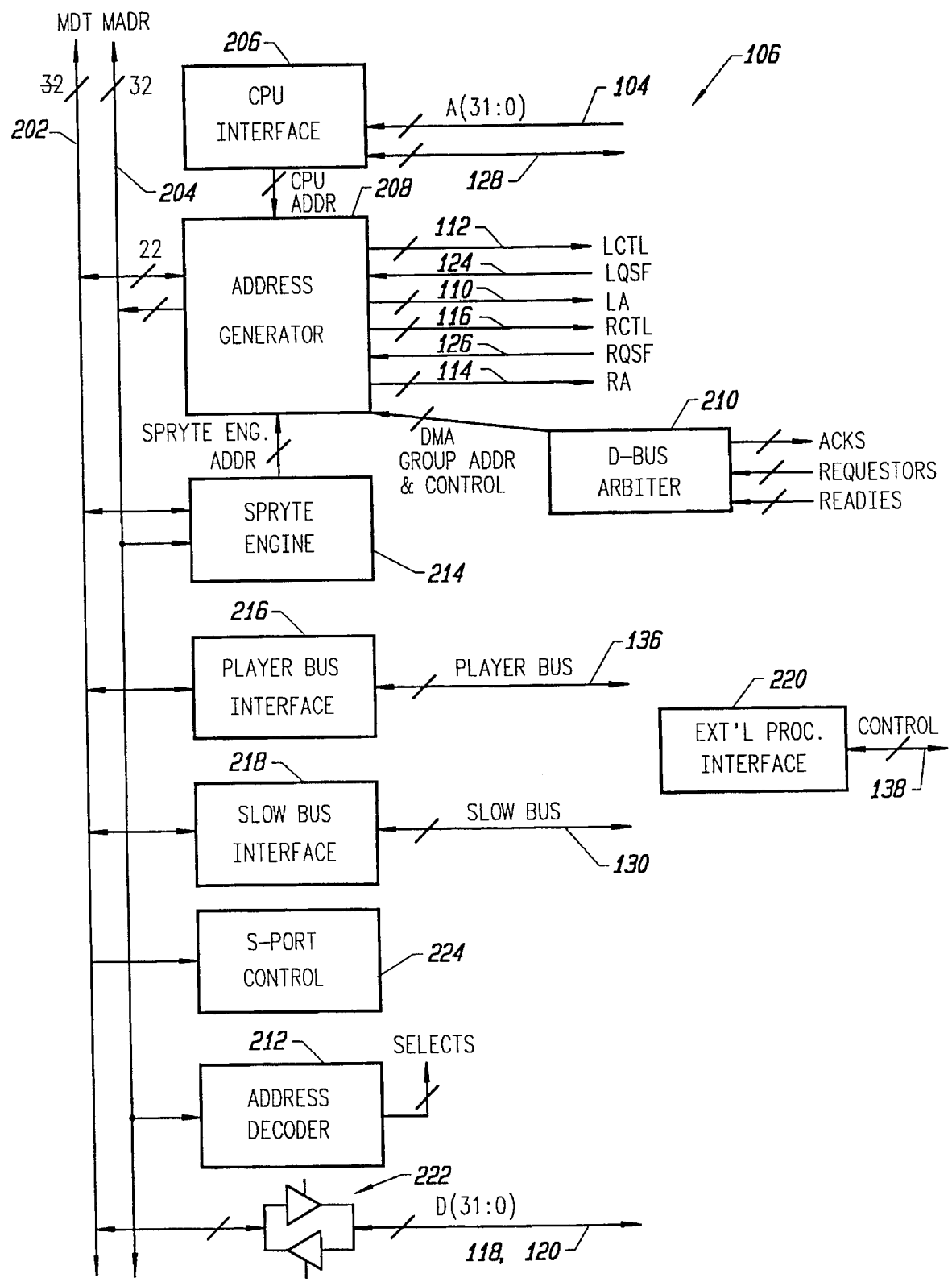
FIG. 2 is a symbolic block diagram of the address manipulator of FIG. 1.

FIG. 2 is a symbolic block diagram showing major functional units of the address manipulator chip 106 of FIG. 1. It comprises an internal 32-bit MDT data bus 202, an internal 32-bit MADR address bus 204. The MDT data bus 202 is coupled to the left and right half system D-bus 118, 120 via buffers 222. The chip 106 also includes a CPU interface unit 206 which is coupled to receive CPU-generated addresses over the A-bus 104, and also communicates with the CPU 102 over control lines 128. Among the control lines 128 is an MCLK signal provided by the CPU interface 106 to the MCLK input of CPU 102, which is the memory clock input of CPU 102. Address manipulator 106 controls the waveform of this clock signal to both stretch CPU cycles for slow accesses and to put the CPU 102 to sleep for long periods of time. The ARM 60 CPU is a static part which does not need maintain any minimum clock input frequency.

Addresses generated by the CPU 102 are passed by the CPU interface 206 to an address generator 208 when a D-bus arbiter 210 grants control of the D-bus and address generator 208 to the CPU 102. The address generator 208 drives the high-order address bits from A(31:16) onto the MADR bus 204, where they are decoded by an address decoder 212. Address decoder 212 determines from these bits whether the desired address represents a memory-mapped hardware register, in which case it activates the appropriate select line to notify the appropriate hardware component in the system of FIG. 1. That hardware component then performs the desired function in response to bits A(15:2) of system address bus 104. If address decoder 212 determines that the desired address is part of system memory 108, then it so notifies the address generator 208. Address generator 208 generates the appropriate addressing and control signals on the LCTL and LA buses 112 and 110, and the RCTL and RA buses 116 and 114.

Address generator 208 receives addresses from the CPU via the CPU interface 206 and also from spryte engine 214. Address generator 208 also maintains a stack of DMA control information and can generate addresses for DMA transfers. The D-bus arbiter 210 receives requests from the various devices for transfers over the D-bus, arbitrates among them, and indicates to address generator 208 which request to service. Even though the two halves of system memory are addressed and controlled separately, only one master may be operational at a time. If the winning requestor has requested a DMA transfer, then the D-bus arbiter 210 supplies the address generator 208 with a DMA group address indicating where in the DMA stack the desired control information may be found for the requested transfer. In effect, the DMA group address identifies a particular DMA channel. The DMA interface is handled entirely within the address manipulator chip 106.

The spryte engine 214 is coupled to the internal MDT data bus 202, and the functions and operation of the spryte engine 214 are described in more detail below.

Address manipulator chip 106 also includes a player bus interface 216 and a slow bus interface 218, for interfacing respectively to the player bus 136 and the slow bus 130. These need not be described here in detail.

D-bus arbiter 210 receives requests from various requestors for access to the D-bus and D-port of system memory 108. When D-bus arbiter 210 grants the bus to a particular requestor, it sends an acknowledge signal to the requestor. The details of the D-bus arbiter need not be described here, except to note that the CPU 102 is intentionally given the lowest priority in the arbitration for access to the D-bus port of system memory 108 because in the architecture of FIG. 1, the CPU 102 is conceived to perform housekeeping functions only. All the other functional units in the system are more tightly coupled with the memory than the CPU is, so they can perform their functions at high speed. In the past, the requirement that the CPU perform many of the detailed functions of an interactive multi-media system either limited the performance and realism of the system, or mandated the use of a powerful and expensive CPU, or both.

II. Spryte Manipulation Subsystem

The spryte engine 214 (FIG. 2) is described in detail in the related SPRYTE RENDERING SYSTEM WITH IMPROVED CORNER CALCULATING ENGINE AND IMPROVED POLYGON-PAINT ENGINE and IMPROVED METHOD AND APPARATUS FOR PROCESSING IMAGE DATA applications. Without repeating those descriptions, it is useful to note here that whereas conventional imaging systems are built around the concept of a "sprite", the embodiment described herein refers instead to a "spryte". The difference in spelling is intentional. A conventional sprite consists of a rectangularly-shaped area of image data, with all scan lines of a conventional sprite having the same length. A "spryte", on the other hand, is defined herein as a compilation of horizontal scan-lines extending from, and to the right of, a vertical (hypothetical) spryte edge line where each scan line includes data representing a number of successive source pixels. The length of each spryte scan-line is independently controlled by an EOL (end-of-line) terminating code or other appropriate means. The top point on the spryte edge line is defined by a spryte corner position. The total number of horizontal lines which collectively define a spryte is given by a spryte line count. A spryte can include scan-lines with no pixels in them, and particular pixels within a spryte can be designated as transparent. In effect, therefore, a spryte can be thought of as having any shape that might be desired.

III. Address Generator 208

Figure 3A:
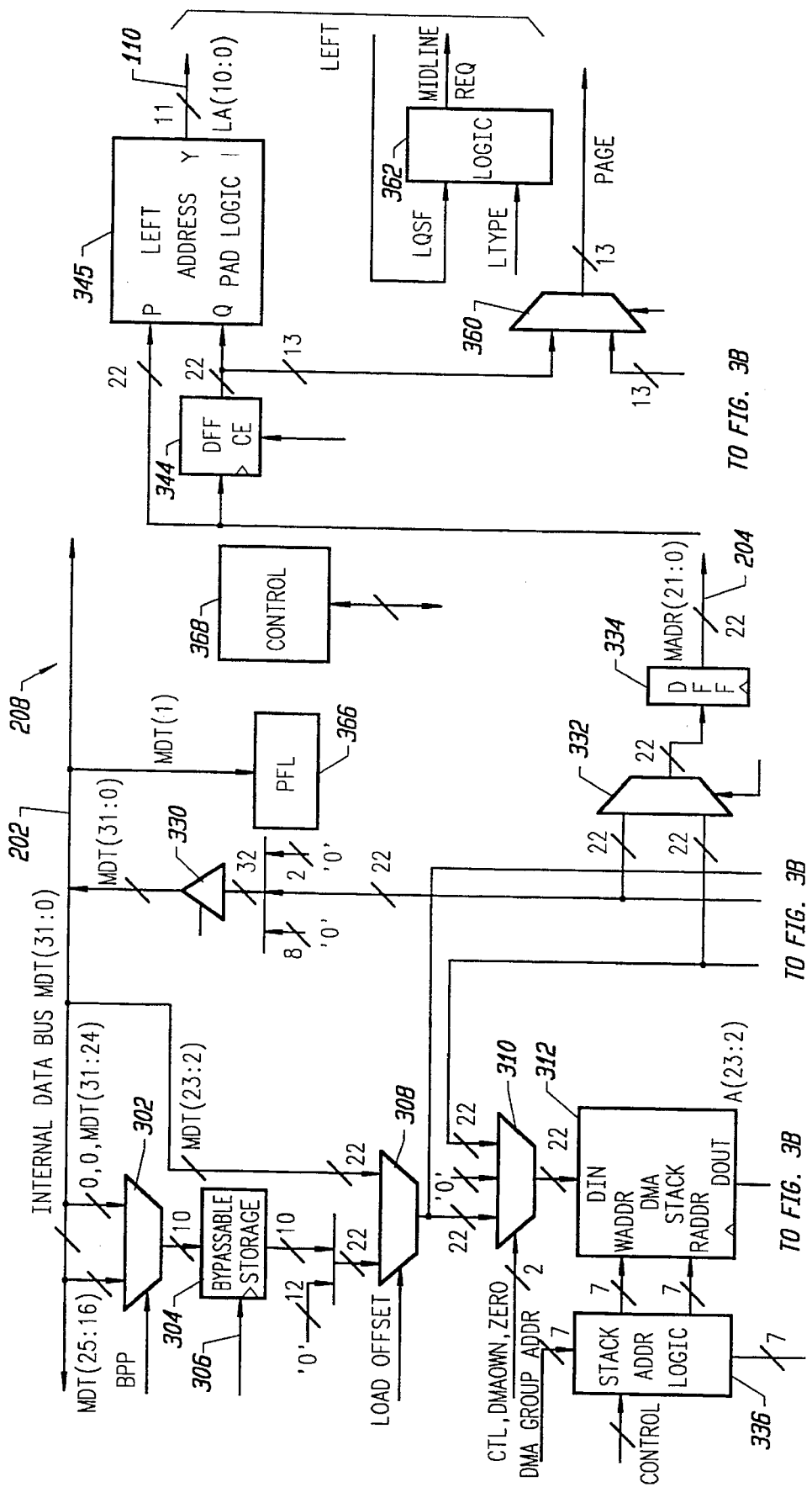
FIG. 3 is a block diagram of part of the address generator of FIG. 2.
Figure 3B:
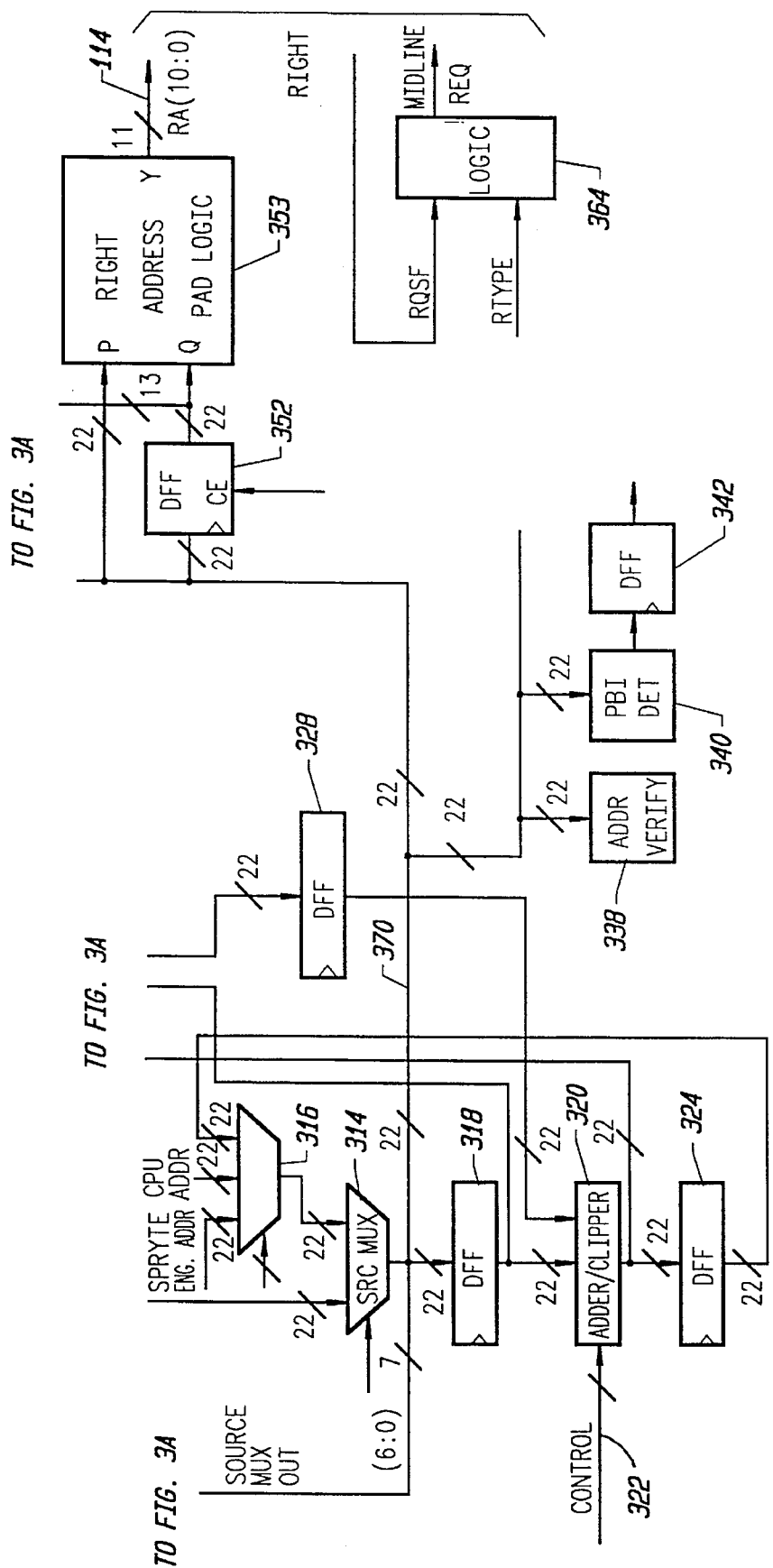
Figure 4:
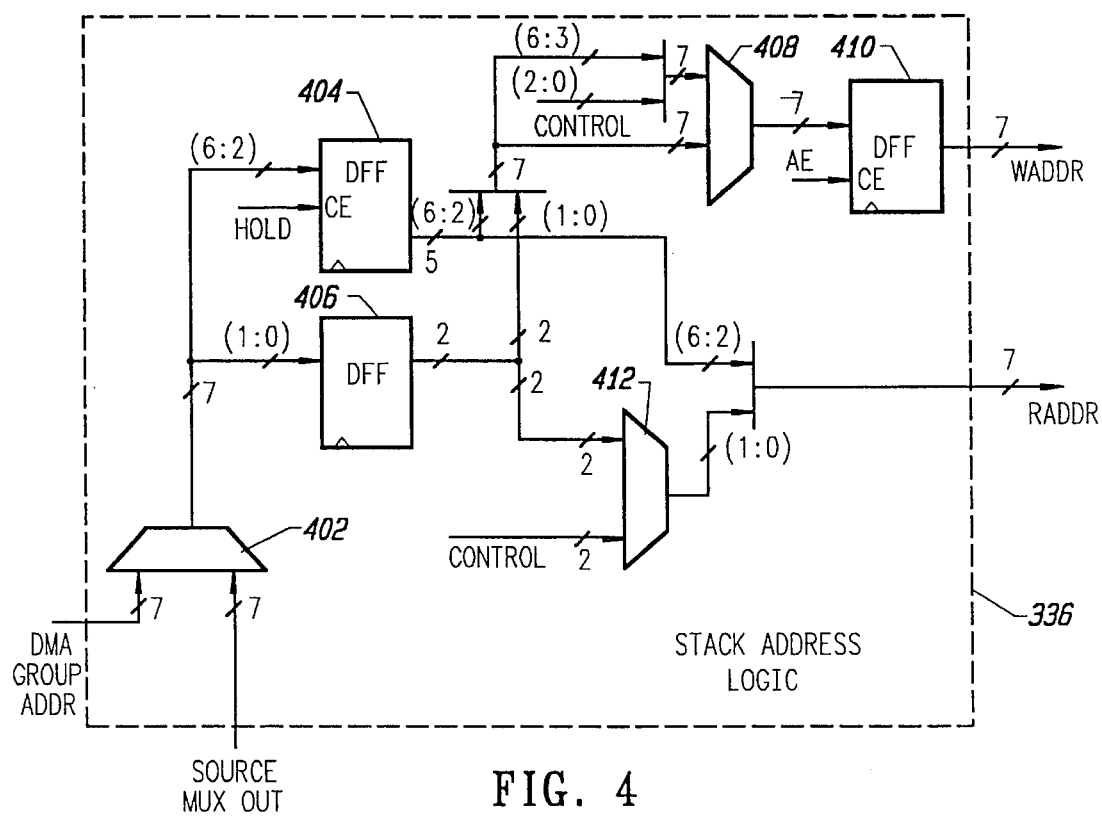
FIG. 4 is a block diagram of the stack address logic of FIG. 3.
Figure 5:
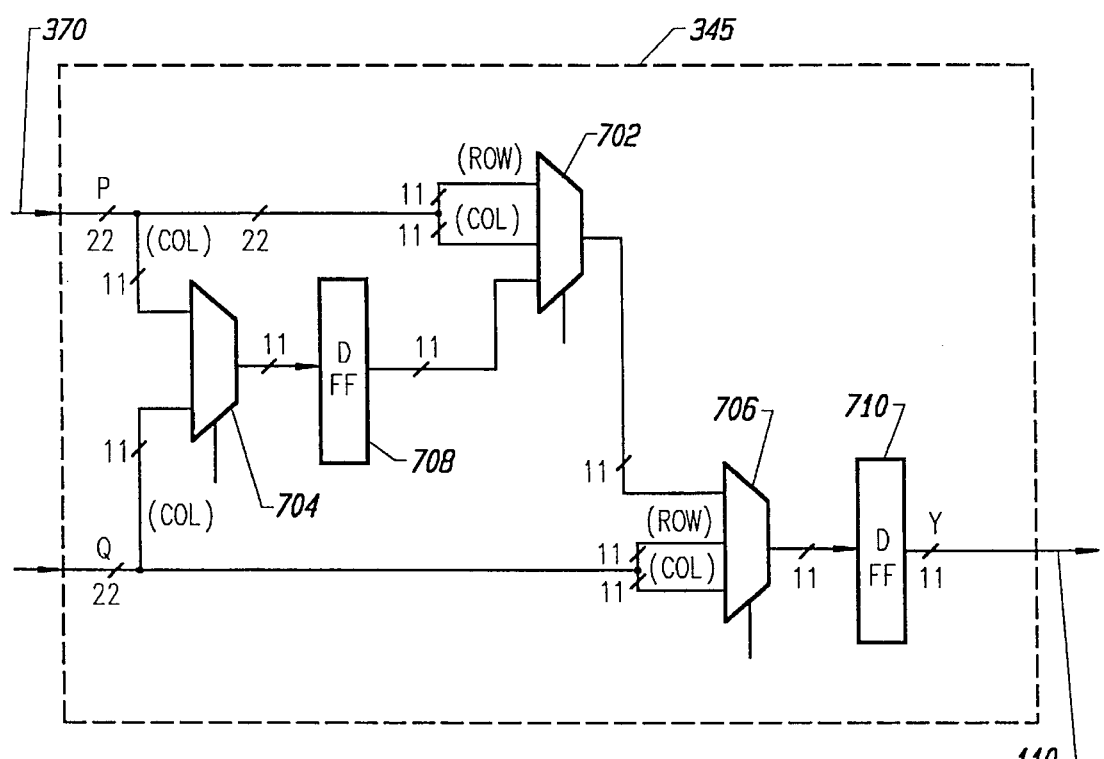
FIG. 5 is a block diagram of left address pad logic of FIG. 3.

FIG. 3 is a block diagram of parts of address generator 208 (FIG. 2). FIG. 4 is a block diagram of stack address logic 336 (FIG. 3), and FIG. 5 is a block diagram of the left and right address pad logic units 345, 353 (FIG. 3). These units are described in detail in the above-mentioned AUDIO/VIDEO COMPUTER ARCHITECTURE application and need not be repeated here. It is worthwhile noting, however, that CPU-originated addresses and addresses originating from the spryte engine are provided to the memory 108 via respective input ports of a multiplexer 316. All other system memory accesses are performed by DMA using the DMA stack 312.

The 128 22-bit registers in the DMA stack 312 are organized in groups, each group storing the information required to control a respective DMA "channel". Each group is located at a respective fixed set of addresses in the DMA stack 312, and each channel is predefined to control transfers from a particular source device to a particular destination device. Table I sets forth certain information about the channels used for the spryte engine:

IV. Spryte Control Block (SCoB)

Before describing how spryte source data is provided to the spryte engine 214, it will be useful to describe a data structure known as a spryte control block (SCoB). A SCoB controls the hardware operations to be performed on a particular spryte. Before invoking the spryte engine 214, the CPU 102 prepares a linked list of such SCoBs in system memory 108, and then loads a memory-mapped register in the address generator 208 to indicate where to find the first SCoB.

The SCoB data structure contains the words set forth in Table II below.

TABLE II

SCoB Data Structure

| Number of Bits | Name | Description |
|---|---|---|
| 32 | FLAGS | Assorted flags. This is the first word read by the spryte-rendering hardware. (The flag bits are detailed in below TABLE III.) |
| 24 | NEXTPTR | Address of next SCoB to process. (Format is absolute or relative.) Spryte rendition takes place by stepping through a linked list having one or more SCoB's. After a first source spryte is mapped to, and painted onto a designation grid area defined by its SCoB, the spryte-rendering engine processes the next SCoB, if any, and renders its source spryte onto its designated destination surface. The linked list can be circular if desired so that the process is repeated iteratively. |
| 24 | SOURCEPTR | Address in system memory 108 of image data that is to be rendered as a spryte. |
| 24 | PIPPTR | Address in system memory 108 of Pen Index Palette (PIP) that is to be loaded into the IPS unit in spryte engine 214. |
| 32 | XPOS | Horizontal position (in 640-max pixels format) in the destination grid of the upper left corner of the to-be rendered spryte, including 16 bits which represent a fraction (non-integer) position-defining portion. |
| 32 | YPOS | Vertical position (in 480-max pixels format) in the destination grid of the upper left corner of the to-be rendered spryte, including 16-bit fraction part. |
| 32 | DX | Horizontal position increment from mapped first corner of a source pixel to mapped second corner of a source pixel when scanning and re-mapping the first spryte row onto the destination grid (format is two 16-bit half-words which are expressed in |

TABLE I

| Grouping Type | No. Groups | Registers Per Grp | Looping Available | Interrupts Available | Transfers Controlled | Channels Available | Max DMA Burst Len |
|---|---|---|---|---|---|---|---|
| Spryte Engine | 1 | 8 | No | No | Spryte control data | 1 | 7 words |
| | | | | | PIP data | 1 | 4 words |
| | | | | | Spryte source data start address | 1 | 1 word |
| | | | | | Spryte image data | 2 | 4 word |

TABLE II-continued

SCoB Data Structure

| Number of Bits | Name | Description |
|---|---|---|
| | | integer.fraction form as: 12.20). |
| 32 | DY | Vertical position increment from mapped first corner of a source pixel to mapped third corner of a source pixel when scanning and re-mapping the first spryte row (12.20). |
| 32 | LINEDX | Horizontal position increment in destination grid from top left corner of 1st mapped spryte row to top left corner of 2nd mapped spryte row (16.16). |
| 32 | LINEDY | Vertical position increment from 1st line to 2nd (16.16). |
| 32 | DDX | Increment to DX for each successive row after the 1st row of the spryte being rendered (12.20). |
| 32 | DDY | Increment to DY for each successive line processed (12.20) after 1st line. |
| 32 | PPMPC | PPMP control word (two halfwords: 16, 16) (See Table IV). |
| 32 | PRE0 | Possible 1st preamble word. |
| 32 | PRE1 | Possible 2nd preamble word. |

The bits of the FLAGS word specified above are defined as set forth in Table III. These flag bits control specific fetching and rendering operations of the spryte-rendering engine 214. The data specific control bits are found in the preamble word of the source data.

TABLE III

FLAGS Word

| Bits | | Name | Description |
|---|---|---|---|
| B31 | = | SKIP | If set, skip this SCoB. |
| B30 | = | LAST | If set, this is the last SCoB to process. |
| B29 | = | NPABS | 1 = Absolute, 0 = Relative address for NEXTPTR. |
| B28 | = | SPABS | 1 = Absolute, 0 = Relative for SOURCEPTR. |
| B27 | = | PPABS | 1 = Absolute, 0 = Relative for PIPPTR. |
| B26 | = | LDSIZE | Load 4 words of size and slope data. (DX, DY, LINEDX, LINEDY). |
| B25 | = | LDPRS | Load 2 words of perspective (skew control) data. (DDX, DDY). |
| B24 | = | LDPPMP | Load new PPMP control word (PPMPC) into PPMP control registers. |
| B23 | = | LDPIP | Load new PIP data into PIP. |
| B22 | = | SCoBPRE | Preamble location. 1 = At end of SCoB, 0 = At start of source data. |
| B21 | = | YOXY | Translate the XY values to a system memory address value and write the corresponding data to the hardware. |
| B20:B19 | = | xx | Reserved. |
| B18 | = | ACW | Allow rendering of a CW (clockwise) oriented destination pixel. |
| B17 | = | ACCW | Allow rendering of a CCW oriented destination pixel. |
| B16 | = | TWD | Terminate rendition of this Spryte if wrong direction is encountered (CW-CCW). |
| B15 | = | LCE | Lock the operations of the 2 corner-calculating engines together. (at H change). |
| B14 | = | ACE | Allow the second corner-calculating engine to function. |
| B13 | = | ASC | Allow Super-Clipping (the local switch is ANDed with ASCALL). |
| B12 | = | MARIA | 1 = disable full-math region-fill |

TABLE III-continued

FLAGS Word

| Bits | | Name | Description |
|---|---|---|---|
| | | | action and use only the faster Munkee decisions as instructions to the destination line-filler. |
| B11 | = | PXOR | 1 = set PPMP XOR mode. (XOR the A and B sources while disabling adder.) |
| B10 | = | USEAV | 1 = use the "AV" bits in PPMPC to control PPMP math functions. |
| B9 | = | PACKED | Primary source spryte type, 1 = packed, 0 = totally literal. (Secondary source spryte is always totally literal.) |
| B8:B7 | = | DOVER | D-Mode override. 00 = use the D-bit generated by the IPS unit to select the output of CMUX , 01 = reserved, 10 = select the A input of the CMUX, 11 = select the B input of the CMUX. |
| B6 | = | PIPPOS | Use PIP generated bits as the sub-position bits (B0 & B15 of the Output-PEN signal) instead of the SCoB selection made below by B15POS and B0POS. |
| B5 | = | BGND | 1 = background spryte type. |
| B4 | = | NOBLK | 1 = no black spryte type. |
| B3:B0 | = | PIPA | PIP address bits, these are used to pad the 5-bit wide PIP address input signal when BPP (Bits Per Pixel) output of unpacker is less than 5 bits wide. |

The PPMP control word (PPMPC) has two 16-bit wide halves. One half is used when the CMUX select control bit=0, the other half is used when the CMUX select control bit=1. The bits of only the upper half are defined as set forth in Table IV. The lower half has identical structure.

TABLE IV

PPMPC Word

| Bits | | Name | Description |
|---|---|---|---|
| B31 | = | S1 | Select 1st multiplier input signal. 0 = use IPN (Source A), 1 = use cFB data (Source B). |
| B30:B29 | = | MS | Select 2nd multiplier input signal. 0 = MxF (source is SCoB), 1 = MUL (source is IPS), 2 = IPNM (source is IPS), 3 = xx (multiply by default value, 1 or 0). |
| B28:B26 | = | MxF | Multiply Factor. 0→7 means multiply by 1→8. (only used if MS = 0). |
| B25:B24 | = | Dv1 | First divide-by Scaling-factor. 1 = divide by 2, 2 = divide by 4, 3 = +8, 0 = divide by 16. |
| B23:B22 | = | S2 | Selector of secondary input signal. 0 = "apply 0 value to Adder port B", 1 = use AV word (from SCoB), 2 = use cFBD (Source B), 3 = use IPS output (Source A). |
| B21:B17 | = | AV | Adder Value. 5 bit value to be added if S2 = 1. This 5-bit signal is also used as a math control word if USEAV = 1. |
| B16 | = | Dv2 | Post addition, 2nd divider. 0 = divide by 1, 1 = divide by 2. |

Aside from providing an "add value", the AV bits serve a secondary function as follows when USEAV=1. The secondary functions are set forth in Table V.

TABLE V

Secondary AV Bit Functions

| Bits | | Function |
|---|---|---|
| AV0 | = | Invert the output of the second divider in the PMPP and set the carry-in of the adder. |
| AV1 | = | Enable the sign-extend function for the signals flowing down the second math side of the PMPP (Post possible XOR). |
| AV2 | = | Disable the wrap-limiter function. (Use the 5 LSB's of the 8-bit adder output and ignore possibility that it wrapped above decimal 31 or below decimal zero.) |
| AV3:AV4 | = | Select second side divider value as: 00 = divide by 1, 01 = divide by 2, 10 = divide by 4, 11 = divide by_(reserved). |

There is also a general spryte-rendering engine control word, referred to as SCOBCTL0. It is loaded only by the CPU. Its bits are set forth in Table VI.

TABLE VI

SCOBCTL0 Engine Control Word

| Bits | | Name | Description |
|---|---|---|---|
| B31:B30 | = | B15POS | B15 oPEN selector for output of PMPP. (This bit can function as a subposition defining bit that is used by the pre-display interpolater.) 0 = 0, 1 = 1, 2 = xx, 3 = same as Source data |
| B29:B28 | = | B0POS | B0 oPEN selector for output of PMPP. (This bit can also function as a subposition defining bit that is used by the pre-display interpolater.) 0 = 0, 1 = 1, 2 = PPMP math, 3 = same as Source data |
| B27 | = | SWAPHV | 1 = Swap the H and V subpositions prior to their entry into the PPMP |
| B26 | = | ASCALL | 1 = Allow super clipping function (master enable switch) |
| B25 | = | xx | Reserved |
| B24 | = | CFBDSUB | 1 = use the H and V subposition bits of the cFB data in place of (vice) the spryte source values when the cFB data is selected as a PPMP source. (Note: CFBDsel = (S1 = 1) OR (S2 = 2).) |
| B23:B22 | = | CFBDLSB | cFBD PPMP Blue LSB source. 0 = 0, 1 = cFBD[B0], 2 = cFBD[B4], 3 = x |
| B21:B20 | = | IPNLSB | IPN PPMP Blue LSB source. 0 = 0, 1 = IPN[B0], 2 = IPN[B4], 3 = x |

Note that when 'relative' has been specified in the flags for NEXTPTR, SOURCEPTR, or PIPPTR, the value that should (must) be placed in the SCoB is the word distance from the address in RAM that has the relative value in it to the address in RAM that is desired to be the new address MINUS FOUR. (REL=Target−PC−4). Also note that the B0POS value of '2' is the only setting that uses PPMP math to control the B0 bit in the actually output oPEN signal. When this setting is chosen, the Blue LSB will also be included in the input parameters of the black detector.

There are 2 basic formats of Spryte image data, totally literal format and non-totally literal format. There are subgroups within each basic format. In non-totally literal Sprytes, the image data consists of groups of words that represent source scan lines of data. In totally literal Sprytes, the image data consists of purely image data (no intermingled control functions).

Non-totally literal Sprytes require one word preamble, whereas totally literal Sprytes require two words of preamble. These preamble words may be located at the end of the SCoB words (but before the PIP) as set forth in Table II, or at the start of the image data. The normal location for these words is at the start of the image data, but for totally literal Sprytes that are in frame buffer format, they are typically at the end of the SCoB that invokes that spryte.

Non-totally literal Sprytes can be compacted to save both memory space and rendering time. Each source scan line of data has its horizontal word size specified as part of the data. Totally literal Sprytes have a rectangular format that is specified in the preamble of the data.

The first preamble word for all sprytes is the data structure preamble. It contains the data-specific control bits for the source data, defined in Table VII.

TABLE VII

First Spryte Data Preamble Word

| B31→B21 | = | Reserved, set to 0. | |
|---|---|---|---|
| B20 | = | PACKED. | This is identical to the PACKED bit in the SCoB |
| B19→B16 | = | Reserved, set to 0. | |
| B15→B6 | = | VCNT | Vertical number of source data lines in this image data, minus 1. (10 bits) |
| B5 | = | Reserved, set to 0. | |
| B4 | = | LINEAR. | 0 = use PIP for generating IPN output of IPS unit, 1 = use PIN for outputting IPN. |
| B3 | = | REP8 | 1 = replicate the bits in the linear 8 Spryte, 0 = fill with 0. |
| B2→B0 | = | BPP | Bits/pixel, pixel type. |

VCNT is loaded into a hardware counter in the Spryte requestor and is decremented at the end of the fetching of each source scan line of data. When the count is at −1, there are no more source lines of data in the object. Note that Spryte processing does not end here, this is merely one of the events that is required to end a Spryte. VCNT=line count −1.

An initial value of −1 for VCNT will cause a "REAL BIG Spryte" to be fetched. There is no 'zero line count' value.

The LINEAR bit applies only when the BPP type indicates 8 bits per pixel or 16 bits per pixel. In those cases, there are enough PIN bits to provide a 15 bit IPN without using the PIP. Since the PIN bits are spread linearly across the IPN, and it will result in a linear translation from PIN to IPN, the mode is called 'LINEAR'. The LINEAR bit should be set only for sprytes having 8 or 16 bits per pixel, known as LINEAR 8 and LINEAR 16 (as opposed to 'normal' 8 or 16) format.

The REP8 bit is effective only in the 8 bit per pixel source data size.

Table VIII defines the BPP control bits decode.

TABLE VIII

BPP Field

| BPP | Data Size | PIP DMA Size | IPN Trans Bits | D-bit | R-Mul | G-Mul | B-Mul |
|---|---|---|---|---|---|---|---|
| 0 = | Reserved | 4 PIP words | Reserved | | 0 | 0 | 0 |
| 1 = | 1 bit | 4 PIP words | PIN[0] | PIP[15] | 0 | 0 | 0 |
| 2 = | 2 bit | 4 PIP words | PIN[1:0] PIP[15] | 0 | 0 | 0 | |
| 3 = | 4 bit | 8 PIP words | PIN[3:0] PIP[15] | 0 | 0 | 0 | |
| 4 = | 6 bit | 16 PIP words | PIN[5:0] PIN[5] | 0 | 0 | 0 | |
| 5 = | 8 bit | 16 PIP words | PIN[7:0] PIP[15] | PIN[7:5] | PIN[7:5] | PIN[7:5] | |
| 6 = | 16 bit | 16 PIP words | PIN[14:0] | PIN[15] | PIN[13:11] | PIN10:8] | PIN[7:5] |
| 7 = | Reserved | 16 PIP words | Reserved | | 0 | 0 | 0 |

If the PACKED bit in the SCoB is '0', then the source data is totally literal. For totally literal Sprytes, there is a second preamble word. It contains, among other things, the horizontal pixel count for each line of the source data and the word offset from one line of source data to the next. These bits are valid only while the totally literal Spryte is being rendered, and they are not used when the current Spryte is not totally literal. The bit fields of the second preamble word are defined in Table IX.

TABLE IX

Second Spryte Data Preamble Word

| | | | |
|---|---|---|---|
| B31→B24 | = | WOFFSET(8). | Word offset from one line of data to the next (−2) (8 bits). Bits 23→16 of offset are set to 0. |
| B25→B16 | = | WOFFSET(10). | Word offset from one line of data to the next (−2) (10 bits). Bits 31→26 of offset are set to 0. |
| B15 | = | Reserved, | Set to 0. |
| B14 | = | NOSWAP | 1 = disable the SWAPHV bit from the general spryte control word. |
| B13→B12 | = | TLLSB | IPN PPMP blue LSB source. 0 = 0, 1 = IPN[0], 2 = IPN[4], 3 = IPN[5]. |
| B11 | = | LRFORM | Left/right format. |
| B10→B0 | = | TLHPCNT | Horizontal pixel count (−1) (11 bits). |

The TLLSB bits perform the same function that the IPNLSB bits perform in normal Sprytes.

If LRFORM=1, the source data has the frame buffer format of the screen as a source format. Vertically adjacent pixels in the rectangular display space are horizontally adjacent in the 2 halves of a memory word. This is useful for the 16 bit per pixel totally literal data format. The unpacker in spryte engine 214 will disable the 'B' FIFO data requests and alternately place pixels from the source into both FIFOs. Left 16 bits go to 'A' FIFO, right 16 bits go to 'B' FIFO. The data requests for 'A' FIFO are made in a request 'pair' to minimize page breaks and other latencies. The hardware locks the corner engines to operate together (regardless of the LCE bit).

TLHPCNT is the number of pixels in the horizontal dimension, minus 1. This is the number of pixels that the spryte engine 214 will attempt to render for each horizontal line of the Spryte source data. This value is used by the data unpacker. A '0' value for TLHPCNT will attempt one pixel. A '−1' value will attempt many pixels. There is no 'zero pixel count' value.

WOFFSET is the offset in words of memory from the start of one line of data to the start of the next line, minus 2. If the BPP for this Spryte indicates an 8- or 16-bit per pixel format, WOFFSET(10) or WOFFSET(8) is appropriate. This number is zero for the minimum sized Spryte (2 words).

By arranging WOFFSET and TLHPCNT correctly, it is possible to extract a rectangular area of data out of a larger sized rectangular area of data.

The address generator 208 will also use WOFFSET as the length value in the normal data fetch process. WOFFSET and TLHPCNT must be set so that WOFFSET does not expire first.

In the spryte packed data formats, the first one or two bytes of data on each line of spryte source data contain a word offset from the start of this line of source data to the start of the next line of data, minus 2. In Sprytes having six or fewer bits per pixel, only 1 byte (bits 31:16) of offset are used. However, the actual offset has a maximum size of 10 bits. The rest of the bits in the 2 bytes are set to 0. 10 bits of word offset is 2048 pixels at 16 bits per pixel. 8 bits of word offset at 6 bits per pixel is 1365 pixels. The requirement is 1280 pixels.

This offset is used by the address generator 208 both to calculate the start of the next line of spryte source data (by adding it to the start of the current line), and to set the maximum length (by subtracting 1 and placing it in the DMA stack length register) for the current DMA transfer.

Also in packed spryte data formats, the next data after the offset is a control byte and zero or more bits of PIN data. The number of bits used for each PIN is specified by BPP.

The control byte consists of a 2-bit code and a 6-bit count, as follows:

| | |
|---|---|
| 00xxxxxx | end of line, xxxxxx need not be present |
| 01count | literal PINs for 'count + 1' |
| 10count | Defined 'transparent' for 'count + 1' |
| 11count | packed 'PIN' for 'count + 1' |

The 'transparent' definition will actually output a 'transparent' bit from the unpacker. This will cause the remainder of the pixel processing pipe to ignore this pixel.

V. Spryte Rendering Process

In order to render a spryte into an area of system memory 108, the CPU 102 first sets up the required data in a different area of the system memory 108. Such data includes 6 to 15 32-bit words as specified in Table II above, all located contiguously in system memory 108; 4, 8 or 16 optional 32-bit words contiguously located in system memory 108 to represent PIP data; and spryte image data of any length. Of the 6 to 15 words specified in Table II, note that several groups are optional as set forth more fully below. Note also that the second word of the SCoB is a pointer to the next SCoB to process; thus, the CPU may create a linked list of any number of SCoBs to process in sequence, each defining its own spryte source data, optional PIP data, and spryte rendering control information.

Also prior to starting the spryte engine, the CPU 102 writes desired information directly into certain memory-mapped hardware registers as follows:

SCOBCTL0.

32-bit word defined in Table VI above.

REGCTL0.

Controls the modulo for reading source frame buffer data into the primary and/or secondary input port of the spryte engine 214 and for writing spryte image result data from the spryte engine 214 into a destination frame buffer in system memory 108. The modulo effectively indicates the number of pixels per scan line as represented in the respective frame buffer in system memory 108.

Only the low-order 16 bits of REGCTL0 are used. The low-order 8 bits specify the modulo for the source frame buffer, and the next 8 bits specify the modulo for the destination frame buffer. For each of the two modulo designations, the low-order 4 bits specify a G1 value and the high-order 4 bits specify a G2 value. The modulo specified for a particular buffer is then calculated as G1+G2. Thus the following bits of REGCTL0 are defined (CFBD refers to current frame buffer data, a source buffer separate from spryte source data, which the spryte engine may read as input data):

| REGCTL0 BIT | DESCRIPTION |
|---|---|
| 0 | G1 = 32 for CFBD read buffer. |
| 1 | Undefined. Set to 0. |
| 2 | G1 = 256 for CFBD read buffer. |
| 3 | G1 = 1024 for CFBD read buffer. |
| 4 | G2 = 64 for CFBD read buffer. |
| 5 | G2 = 128 for CFBD read buffer. |
| 6 | G2 = 256 for CFBD read buffer. |
| 7 | Undefined. Set to 0. |
| 8 | G1 = 32 for destination buffer. |
| 9 | Undefined. Set to 0. |
| 10 | G1 = 256 for destination buffer. |
| 11 | G1 = 1024 for destination buffer. |
| 12 | G2 = 64 for destination buffer. |
| 13 | G2 = 128 for destination buffer. |
| 14 | G2 = 256 for destination buffer. |
| 15 | Undefined. Set to 0. |

The software must ensure that no more than one bit in each nibble is set. The hardware does not protect against setting more than one bit. If no bits are set in a nibble, the contribution to the resultant modulo is zero.

REGCTL1.

X and Y clip values, effectively indicating the number of pixels in the X and Y dimensions which make up the frame buffer. Bits 26:16 indicate the last writeable row (counting from row 0) in the Y dimension and bits 10:0 indicate the last writeable column (counting from col. 0) in the X dimension. All other bits must be zero. As an example, a value of 00EF013F indicates that the frame buffer data is represented in 320×240 format.

REGCTL2.

Read base address. Indicates the address in system memory 108 of the upper left corner pixel of the source frame buffer data.

REGCTL3.

Write base address. Indicates the address in system memory 108 of the upper left corner pixel of the destination frame buffer (CFBD).

Also before the spryte engine is started, the CPU 102 places the address of the first SCoB in the linked list into the DMA stack 312 register corresponding to "next SCoB". The CPU then writes to the memory mapped address designated SPRSTRT in order to start the spryte engine running. Once the spryte engine starts running, it retains exclusive control of the D-bus until either it finishes processing all the SCoBs in the list, or an interrupt occurs. If an interrupt occurs, the spryte engine continues to a convenient stopping point, then releases the D-bus. The CPU then vectors to an appropriate interrupt handler, and when done, returns to the routine which originally started the spryte engine. That routine checks the status bit SPRON in a memory mapped status bit register to determine whether the spryte engine stopped due to an interrupt or due to completion of processing, and if the former, restarts the spryte engine. In an alternative embodiment, the CPU can have a separate bus to program memory, to thereby permit the CPU 102 to perform other tasks while the spryte engine 214 renders the sprytes. In the latter embodiment, the spryte engine can generate an interrupt for the CPU 102 when spryte processing has completed, at which time the CPU 102 can vector to an interrupt handler.

The DMA stack 312 includes an 8-register grouping for spryte control. The eight registers are as follows:

0 CURRENT SCOB ADDRESS
1 NEXT SCOB ADDRESS
2 PIP ADDRESS
3 SPRYTE DATA ADDRESS
4 ENGINE A FETCH ADDRESS
5 ENGINE A LENGTH
6 ENGINE B FETCH ADDRESS
7 ENGINE B LENGTH

When the CPU writes to the SPRSTRT address, after the spryte engine gains control of the system data bus 118, 120, the DMA engine of FIGS. 3 and 4 loads in the first six words from the first SCoB beginning from the system memory address specified in the NEXT SCOB register in the DMA stack 312. To accomplish this, the address of the first word to load is read out of the NEXT SCOB register and provided to the memory address lines via source multiplexer 314. The address is also incremented by adder/clipper 320 and written back via multiplexer 310 into the CURRENT SCOB register in DMA stack 312. All six words are read from memory in this manner, the CURRENT SCOB register maintaining the address of each next word to load.

The first SCoB word read, FLAGS, is written into a 32-bit hardware register in address manipulator chip 106. The next SCoB word read, NEXTPTR, is written into the NEXT SCOB register in DMA stack 312. SOURCEPTR is written into the SPRYTE DATA ADDRESS register of DMA stack 312, and PIPPTR is written into the PIP ADDRESS register in DMA stack 312. XPOS and YPOS are written to two memory mapped hardware registers XYPOSH and XYPOSL, each having the format of x,y. That is, the high-order 16 bits from XPOS and the high-order 16 bits from YPOS are written to the high- and low-order half words, respectively, of XYPOSH, and the low-order 16 bits of XPOS and the low-order 16 bits of YPOS are written to the high and low half words, respectively, of XYPOSL.

After the first six words of the SCoB are loaded, depending on the bits which were set in FLAGS, up to seven additional SCoB words are loaded. The possible words are grouped as a single DMA transfer of up to seven words. If the LDSIZE bit of FLAGS was asserted, then the DMA controller of FIGS. 3 and 4 expects the first four words of this group of seven to be DX, DY, LINEDX and LINEDY. These words are loaded in the same manner as the first six words of the SCoB, the incremented addresses being stored in the CURRENT SCOB register in DMA stack 312. DX and DY are written in x,y format into two memory mapped hardware registers DXYH and DXYL, and LINEDX and LINEDY are written in x,y format to two memory mapped hardware registers DDXYH and DDXYL. Note that if the SKIP bit of the FLAGS word equals one, indicating that the present SCoB is to be skipped, or if the YOXY bit is zero, then the X and Y values are not written to the hardware.

If the LDPRS bit of FLAGS was set, then the DMA control unit of FIGS. 3 and 4 expects the first two words (or the next two words) of the optional seven to contain DDX and DDY. These are written in x,y format to two memory mapped hardware registers DDXYH and DDXYL.

If the LDPPMP bit of the FLAGS word was set, then the DMA control unit of FIGS. 3 and 4 expects the first (next) word of the optional seven words to be PPMPC. This word is written to a memory mapped PPMPC hardware register.

After the second SCoB load of zero through seven words, the DMA control unit of FIGS. 3 and 4 performs a preamble load of either one or two words. If the SCOBPRE bit of FLAGS was set, then the preamble word(s) is (are) assumed to be at the end of the SCoB, in which case the CURRENT SCOB register in DMA stack 312 contains the address of the first preamble word. If SCOBPRE was not set, then the preamble word(s) is (are) assumed to be at the start of the data, in which case the SPRYTE DATA ADDRESS contains the address of the first preamble word. The DMA control unit selects the appropriate register source for the starting address of the preamble load and returns the incremented addresses to the same register.

The first preamble word is always present and is loaded into the appropriate hardware registers. The second preamble word is present only when the PACKED bit of the FLAGS word was zero, indicating that the spryte image data is in "totally literal" format. When the DMA unit reads this word, the information in the WOFFSET field is written to an offset register and the information in the TLHPCNT field is written to a pixel count register in the hardware. The offset indicates the width of the totally literal spryte in memory, and is used by the DMA controller to calculate the start of each next line of the spryte source data. The pixel count indicates the number of pixels to be transferred on each scan line of totally literal spryte source data. These two values are settable independently in order to permit the transfer of only a rectangular portion of a larger bit image, smaller than the overall bit image both in width and height.

After the preamble load, if the LDPIP bit of the FLAGS word was set, the DMA control unit will read out 4, 8 or 16 words of PIN to IPN conversion information, beginning from the address in the PIP ADDRESS register in the DMA stack 312. Incremented addresses are also rewritten into the same DMA stack register. The number of 4-word bursts to perform (if any) depends on the data compression format of the spryte image source data, which is specified in the BPP ("bits per pixel") field of the first preamble word. In particular, as set forth in Table VIII above, a total of four PIP words will be loaded for BPP=0, 1 or 2; eight PIP words will be loaded if BPP=3; and 16 PIP words will be loaded if BPP=4, 5, 6 or 7. Note that since PIP data in system memory 108 is referenced indirectly, the same PIP data may be downloaded from multiple SCoBs. Also, the PIP may be loaded even if it will not be used to decompress the current spryte image source data (which is the case if the LINEAR bit of the first preamble word is one). For loads of all 16 PIP words, the entire PIP is overwritten. For loads of fewer than 16 words, the PIPA field of the FLAGS word indicates the starting address in the PIP for receiving the data.

After the PIP load, the DMA unit of FIGS. 3 and 4 begins transferring spryte image source data from system memory 108 to the data input FIFOs of the spryte engine 214. As set forth above, if the spryte image source data is packed (i.e. not in totally literal format), then at the beginning of each scan line of spryte source data, the first one or two bytes of the first word contain a word offset from the start of the current line of source data to the start of the next line of source data, minus 2. This offset is used by the DMA controller both to calculate the start of each next line of source data and to set the length of a DMA transfer of the line of source data. Accordingly, the DMA controller reads this word from the address specified in the SPRYTE DATA ADDRESS register of the DMA stack 312, incrementing the address and placing it into the ENGINE A FETCH ADDRESS register of the DMA stack 312. The high-order 8 or 10 bits of this word are placed into the ENGINE A LENGTH register of the DMA stack 312, and the entire word is also sent to the spryte engine data input FIFO for corner engine A. The spryte engine knows to ignore this word. Note that if the spryte image source data is in totally literal format, then the single offset value (as well as the pixel count value) specified in the second preamble word and described above applies to the entire spryte.

After the offset is loaded, the DMA controller then transfers additional words of spryte image source data for the current scan line in bursts of up to four words each, as requested by the spryte engine 214. The starting address for each burst is found in the ENGINE A FETCH ADDRESS register of DMA stack 312, and the incremented addresses are placed in the same register. Correspondingly, the DMA controller decrements the value in the ENGINE A LENGTH register of DMA stack 312 according to the number of words transferred.

The DMA controller also updates the SPRYTE DATA ADDRESS register in DMA stack 312 by adding the offset specified in the first word of the scan line, so that that register always points to the next scan line to be processed.

Note that on the conditions described in the above-mentioned SPRYTE RENDERING SYSTEM WITH IMPROVED CORNER CALCULATING ENGINE AND IMPROVED POLYGON-PAINT ENGINE APPLICATION, the spryte engine 214 can also request DMA transfers of 4-word bursts of the next scan line of spryte image source data into the corner engine B data input FIFO, using the ENGINE B FETCH ADDRESS and ENGINE B LENGTH registers. In this manner, both corner engines A and B in the spryte engine 214 can operate on different scan lines of spryte image source data simultaneously, and the DMA controller can burst data to each as independently requested.

Note that there are a number of invalid SCoB bit settings which are not protected against in the hardware. The software must ensure that these combinations are never asserted. Among these combinations are:

1. If the LINEAR bit is set in the first spryte data preamble word, and BPP is set for 8 bits per pixel, then the D-mode selection in the DOVER field of the FLAGS word must not be set to use the choice determined by BPP.

2. If LINEAR is selected, then BPP must be set to be either 8 or 16 bits per pixel.

3. The BPP field and the LINEAR setting in the SCoB must match the format of the incoming source data. If they do not, then the results are unpredictable.

These are some examples; there are many others.

VI. Software Routines

Before setting forth software routines which may be used for implementing the invention, it will be useful to set forth the following C language type definitions and macro definitions:

```
/* copyright 1992 The 3DO Company */
/* The SCB_RELATIVE macro takes the absolute address
 * of an object and returns the sort of relative address needed by
 * the spryte engine. The first argument is the absolute address of
 * the field to receive the relative address, and the second
 * argument is the absolute address of the object to be referenced.
 * For instance, to create a relative pointer to a "next spryte"
 * these arguments would be used:
 *    SCB_RELATIVE(&spryte->scb_NextPtr, &NextSpryte);
 * To make sure the spryte indicates that the pointer to the next
 * spryte is relative, it might be desireable to first explicitly clear
 * the control flag:
 *    ClearFlag(spryte->scb Flags, SCB_NPABS);
 */
#define SCB_RELATIVE(field,linkobject) ((long)
(linkobject)-(long)(field)-4)
#define RGB(a,b,c) (((a)<<10)|((b)<<5)|(c))
#define RGB2(a,b,c) (RGB(a,b,c)*0x00010001)
#define COLORENTRY(index,r,g,b) ((((uint32)(index)<<24)|
((uint32)(r)<<16)\
                    |((uint32)(g)<<8)|((uint32)(b))))
#define MAKE_REGCTL1(width,height) (((width-1)<<
REG_XCLIP_SHFT)\
                    |((height-1)<<
REG_YCLIP_SHFT))
typedef long Color;
typedef long Coord;
typedef long RGB888;
typedef struct Point
    {
    Coord point_X, point_Y;
    } Point;
typedef struct Rect
{
Coord rect_XLeft, rect_YTop, rect_XRight, rect_YBot;
} Rect;
```

A. Screen and Bitmap Routines

The spryte engine 214 is advantageously controlled using three software data structures known as Screen, ScreenGroup and Bitmap. These structures are owned by the system as opposed to a user task, and in order to prevent illegal combinations of control information from reaching the hardware, the information in these structures can be modified only by a routine running in the supervisor mode of the CPU 102. The following are type definitions for the Screen, ScreenGroup and Bitmap data structures.

```
/* copyright 1992 The 3DO Company */
typedef struct Screen
    {
    ItemNode scr;
    ScreenGroup *scr_ScreenGroupPtr;
    VDLEntry *scr_VDLPtr;
    int32  scr_VDLType;
    Bitmap *scr_TempBitmap;
    List scr_BitmapList;
    } Screen;
typedef struct ScreenGroup
    {
    {ItemNode sg;
    /* display location, 0 = top of screen */
    long sg_Y;
    /* total height of each screen */
    long sg_ScreenHeight;
    /* display height of each screen (can be less than the screen's
     * actual height)
     */
    long sg_DisplayHeight;
    } ScreenGroup;
typedef struct Bitmap
    {
    ItemNode bm;
    ubyte *bm_Buffer;
    int32 bm_Width;
    int32 bm_Height;
    int32 bm_ClipWidth;
    int32 bm_ClipHeight;
    int32 bm_VerticalOffset;
    int32 bm_Flags;
    int32 bm_SCOBCTL0;
    int32 bm_REGCTL0;
    int32 bm_REGCTL1;
    int32 bm_REGCTL2;
    int32 bm_REGCTL3;
    } Bitmap;
```

As can be seen, the Bitmap structure includes certain global information about a destination buffer (typically but not exclusively a display buffer) into which the spryte engine 214 is to render sprytes. Such global information includes the base address of the buffer (bm_Buffer), its width, height and characteristics (bm_Width, bm_Height and bm_Flags, respectively), clipping widths and heights (bm_ClipWidth and bm_ClipHeight) beyond which the spryte engine 214 need not render sprytes, a vertical offset value (bm_VerticalOffset), and values for the five spryte engine control registers (bm_SCOBCTL0, bm_REGCTL0, bm_REGCTL1, bm_REGCTL2, bm_REGCTL3). The Screen structure points to a Bitmap structure to be displayed, and a ScreenGroup structure, as well as containing certain other information about the display.

The following are some sample routines to manipulate Bitmaps, ScreenGroups and Screens. Though some of these routines are trivial, it is advantageous that they be provided anyway as operating system routine callable by a user program. In this manner they can run in the supervisor mode of CPU 102.

-40-

(typically but not exclusively a display buffer) into which the spryte engine 214 is to render sprytes. Such global information includes the base address of the buffer (bm_Buffer), its width, height and characteristics (bm_Width, bm_Height and bm_Flags, respectively), clipping widths and heights (bm_ClipWidth and bm_ClipHeight) beyond which the spryte engine 214 need not render sprytes, a vertical offset value (bm_VerticalOffset), and values for the five spryte engine control registers (bm_SCOBCTL0, bm_REGCTL0, bm_REGCTL1, bm_REGCTL2, bm_REGCTL3). The Screen structure points to a Bitmap structure to be displayed, and a ScreenGroup structure, as well as containing certain other information about the display.

The following are some sample routines to manipulate Bitmaps, ScreenGroups and Screens. Though some of these routines are trivial, it is advantageous that they be provided anyway as operating system routine callable by a user program. In this manner they can run in the supervisor mode of CPU 102.

```
/* copyright 1992 The 3DO Company */ int32
SetClipWidth( Item bitmapItem, ulong clipwidth )
/* Set the bitmap's clipping width */
{
    int32 retvalue;
    Bitmap *bitmap;

/* This routine needs to be in supervisor mode */ bitmap = (Bitmap *)CheckItem( bitmapItem, NODE_GRAPHICS, TYPE_BITMAP );
    if ( NOT bitmap )
    {
        retvalue = -1201;
        goto DONE;
    } if ( clipwidth > bitmap->bm_Width )
    {
        retvalue = -1202;
        goto DONE;
    }
```

-41-

```
            bitmap->bm_ClipWidth = clipwidth;
            bitmap->bm_REGCTL1 = MAKE_REGCTL1( bitmap->bm_ClipWidth,
                bitmap->bm_ClipHeight );

5      retvalue = 0;

DONE:
            return( retvalue );
        }

10      int32
        SetClipHeight( Item bitmapItem, ulong clipheight )
        /* Set the bitmap's clipping height */
        {
            int32 retvalue;
15          Bitmap *bitmap;

/* This routine needs to be in supervisor mode */ bitmap = (Bitmap *)CheckItem( bitmapItem, NODE_GRAPHICS, TYPE_BITMAP );
20          if ( NOT bitmap )
                {
                retvalue = -1301;
                goto DONE;
                }

25          if ( clipheight > bitmap->bm_Height )
                {
                retvalue = -1302;
                goto DONE;
                }

30          bitmap->bm_ClipHeight = clipheight;
            bitmap->bm_REGCTL1 = MAKE_REGCTL1( bitmap->bm_ClipWidth,
                bitmap->bm_ClipHeight );

retvalue = 0;

35      DONE:
            return( retvalue );
        }

40      Item
        CreateScreenGroup( Item *screenItemArray, CreateScreenArgs *stargs )
        {
            Item sgitem;
            ScreenGroup *sgptr;
45          Screen *screen;
            Item retvalue;
            int32 currentHeight, width;
            VDLEntry *vdl, *vdl2, *vdl3, **vdlptr;
            Bitmap *bitmap;
50          Item bitmapitem;
            ubyte **bufptr, **bufptr2, *zbufptr, *prevbufptr;
            int32 *widthptr, *heightptr;
            Item *iptr;
            int32 i, i2, i3, size, color;

55          /* This routine needs to be in supervisor mode */

SDEBUG( ("CreateScreenGroup( screenItemArray=$%lx, stargs=$%lx\n",
```

```
                    screenItemArray, stargs) );

retvalue = 0;
           sgitem = 0;

5         sgitem = SuperCreateItem( MKNODEID(NODE_GRAPHICS,TYPE_SCREENGROUP), NULL );
           SDEBUGVDL(("CreateItem returned 0x%x\n",sgitem));
           if ( (int32)sgitem < 0 )
               {
               /* couldn't allocate screen group item */
10             retvalue = -3001;
               goto DONE;
               }

/* Initialize the ScreenGroup item */
15         sgptr = (ScreenGroup *)LocateItem( sgitem );
           SDEBUGVDL( ("LocateItem returned 0x%x\n",sgptr) );

sgptr->sg_DisplayHeight = stargs->st_DisplayHeight;
           sgptr->sg_ScreenHeight = stargs->st_ScreenHeight;

20         iptr = screenItemArray;
           bufptr = stargs->st_BitmapBufArray;
           vdlptr = stargs->st_VDLPtrArray;
           for ( i = 0; i < stargs->st_ScreenCount; i++ )
               {
25             *iptr = SuperCreateItem( MKNODEID(NODE_GRAPHICS, TYPE_SCREEN),
                     NULL );
               if( *iptr < 0 )
                   {
                   retvalue = *iptr; /* couldn't allocate screen item */
30                 goto DONE;
                   }
               screen = (Screen *)LocateItem( *iptr );
               screen->scr_ScreenGroupPtr = sgptr;
               iptr++;
35             SDEBUG(("screen=$%lx\n", (unsigned long)(screen)));

InitList( &screen->scr_BitmapList, "ScreenBitmapList" );

heightptr = stargs->st_BitmapHeightArray;
40             widthptr = stargs->st_BitmapWidthArray;
               currentHeight = 0;
               for ( i2 = 0; i2 < stargs->st_BitmapCount; i2++ )
                   {
                   bitmapitem = SuperCreateItem( MKNODEID(NODE_GRAPHICS, TYPE_BITMAP),
45                       NULL);
                   if ( bitmapitem < 0 )
                       {
                       retvalue = bitmapitem; /* couldn't allocate bitmap item */
                       goto DONE;
50                     }
                   bitmap = (Bitmap *)LocateItem( bitmapitem );
                   AddTail( &screen->scr_BitmapList, (Node *)(&bitmap->bm) );

bitmap->bm_Buffer = *bufptr++;
55                 if ( widthptr ) bitmap->bm_Width = *widthptr++;
                   else bitmap->bm_Width = GrafBase->gf_DefaultDisplayWidth;
                   bitmap->bm_ClipWidth = bitmap->bm_Width;
                   if ( heightptr ) bitmap->bm_Height = *heightptr++;
                   else bitmap->bm_Height = stargs->st_ScreenHeight;
60                 bitmap->bm_ClipHeight = bitmap->bm_Height;
                   bitmap->bm_Flags = 0;
```

-42-

-43-

```
            switch ( bitmap->bm_Width )
                {
                case 32:
                    i3 = G1_RMOD32|G1_WMOD32; break;
                case 64:
                    i3 = G2_RMOD64|G2_WMOD64; break;
                case 96:
                    i3 = G1_RMOD32|G2_RMOD64|G1_WMOD32|G2_WMOD64; break;
                case 128:
                    i3 = G2_RMOD128|G2_WMOD128; break;
                case 160:
                    i3 = G1_RMOD32|G2_RMOD128|G1_WMOD32|G2_WMOD128; break;
                case 256:
                    i3 = G1_RMOD256|G1_WMOD256; break;
                case 288:
                    i3 = G1_RMOD32|G2_RMOD256|G1_WMOD32|G2_WMOD256; break;
                case 320:
                    i3 = G1_RMOD256|G2_RMOD64|G1_WMOD256|G2_WMOD64; break;
                case 384:
                    i3 = G1_RMOD256|G2_RMOD128|G1_WMOD256|G2_WMOD128; break;
                case 512:
                    i3 = G1_RMOD256|G2_RMOD256|G1_WMOD256|G2_WMOD256; break;
                case 1024:
                    i3 = G1_RMOD1024|G1_WMOD1024; break;
                case 1088:
                    i3 = G1_RMOD1024|G2_RMOD64|G1_WMOD1024|G2_WMOD64; break;
                case 1052:
                    i3 = G1_RMOD1024|G2_RMOD128|G1_WMOD1024|G2_WMOD128; break;
                case 1280:
                    i3 = G1_RMOD1024|G2_RMOD256|G1_WMOD1024|G2_WMOD256; break;
                default:
                    SDEBUG(("CreateScreenGroup() bad bitmap width=%d ($%lx)\n",
                        bitmap->bm_Width));
                    retvalue = -3007;
                    goto DONE;
                }
            bitmap->bm_REGCTL0 = i3;
            bitmap->bm_REGCTL1 = MAKE_REGCTL1( bitmap->bm_ClipWidth,
                    bitmap->bm_ClipHeight );
            bitmap->bm_REGCTL2 = (int32)bitmap->bm_Buffer;
            bitmap->bm_REGCTL3 = (int32)bitmap->bm_Buffer;

bitmap->bm_SCOBCTL0 = (0xC0000000 & B15POS_MASK)
                    | (0x20000000 & B0POS_MASK)
                    | (0x00400000 & CFBDLSB_MASK)
                    | (0x00100000 & IPNLSB_MASK);

bitmap->bm_VerticalOffset = currentHeight;
            currentHeight += bitmap->bm_Height;
            }
        } retvalue = sgitem;

DONE:
    if ( retvalue < 0 )
        {
        if ( sgitem > 0 ) SuperexternalDeleteItem( sgitem );
        }
    return( retvalue );
    }
```

-44-

```
      DisplayScreen( Item ScreenItem0, Item ScreenItem1 )
      {
          Screen *scr0, *scr1;
5         ScreenGroup *sg;
          int32 retvalue;

/* This routine needs to be in supervisor mode */

10        SDEBUGVDL(("DisplayScreen( %x, %x )\n", ScreenItem0, ScreenItem1));

scr0 = (Screen *)CheckItem( ScreenItem0, NODE_GRAPHICS, TYPE_SCREEN );
          if ( ScreenItem1 )
              scr1 = (Screen *)CheckItem( ScreenItem1, NODE_GRAPHICS, TYPE_SCREEN );
15        else
              scr1 = scr0;

if (( scr0 == NULL ) || ( scr1 == NULL ))
          {
20            /* invalid screen items */
              retvalue = -3009;
              goto DONE;
          }

25        sg = scr0->scr_ScreenGroupPtr;
          if ( sg NOT = scr1->scr_ScreenGroupPtr )
          {
              /* screen items must be in the same screen group */
              retvalue = -3010;
30            goto DONE;
          }

/* Designate that these are the screens that should be displayed */
          GrafBase->gf_CurrentVDLEven = scr0->scr_VDLPtr;
35        GrafBase->gf_CurrentVDLOdd  = scr1->scr_VDLPtr;

retvalue = 0;

DONE:
40        return( retvalue );
      }
```

The following routine illustrates how to directly
modify a bitmap of a buffer.

```
      /* copyright 1992 The 3DO Company */ int32
50    WritePixel( Item bitmapItem, Coord x, Coord y, Color color )
      /* Write a pixel in the foreground color to the current screen */
      {
          ubyte *ptr;
          int32 retvalue;
55        Bitmap *bitmap;

/* This routine needs to be in supervisor mode */ bitmap = (Bitmap *)CheckItem( bitmapItem, NODE_GRAPHICS, TYPE_BITMAP );
```

The following routine illustrates how to directly modify a bitmap of a buffer.

```
/* copyright 1992 The 3DO Company */
int32
WritePixel(Item bitmapItem, Coord x, Coord y, Color color)
/* Write a pixel in the foreground color to the current screen */
{
    ubyte *ptr;
    int32 retvalue;
    Bitmap *bitmap;
    /* This routine needs to be in supervisor mode */
    bitmap = (Bitmap*)CheckItem(bitmapItem,
        NODE_GRAPHICS, TYPE_BITMAP);
    if (NOT bitmap)
        {
            retvalue = -2001;
            goto DONE;
        }
    if ( x < 0 | x > = bitmap->bm_ClipWidth
            || y < 0 || y > = bitmap->bm_ClipHeight)
        {
            retvalue = -2002;
            goto DONE;
        }
    ptr = bitmap->bm_Buffer
            + (((y >> 1) * bitmap->bm_Width) << 2)
            + ((y & 1) << 1) + (x << 2);
    *ptr++ = (ubyte)(color >> 8);
    *ptr = (ubyte)color;
    retvalue = 0;
DONE:
    return(retvalue);
}
```

The following routines read bitmaps directly. They do not need to be in supervisor mode.

```
/* copyright 1992 The 3DO Company */
void *
GetPixelAddress(Item screenItem, Coord x, Coord y)
/* Return the address of the specified pixel in the screen.
 * A read outside the bitmap boundaries returns a value of
 * NULL.
 */
{
    void *retvalue;
    Bitmap *bitmap;
    Screen *screen;
    /* This routine can be in user mode */
    retvalue = NULL;
    screen = (Screen*)CheckItem(screenItem,
        NODE_GRAPHICS, TYPE_SCREEN);
    if (NOT screen) goto DONE;
    bitmap = screen->scr_TempBitmap;
    if (x < 0 || x > = (bitmap->bm_ClipWidth)
            || y < 0 || y > = (bitmap->bm_ClipHeight))
        goto DONE;
    retvalue = (void*)(bitmap->bm_Buffer
            + (((y >> 1) * bitmap->bm_Width) << 2)
            + ((y & 1) << 1) + (x << 2));
DONE:
    return(retvalue);
}
Color
ReadPixel(Item bitmapItem, GrafCon *gc, Coord x, Coord y)
/* Read a pixel from the graphics context and return its
 * value. A read outside the bitmap boundaries returns a
 * value of < 0.
 */
{
    ubyte *ptr;
    Color retvalue;
    Bitmap *bitmap;
    /* This routine can be in user mode */
    bitmap = (Bitmap*)CheckItem(bitmapItem,
        NODE_GRAPHICS, TYPE_BITMAP);
    if (NOT bitmap)
        {
            retvalue = -2101;
            goto DONE;
        }
    if (x < 0 || x > = bitmap->bm_ClipWidth
            || y < 0 || y > = bitmap->bm_ClipHeight)
        {
            retvalue = -2102;
            goto DONE;
        }
    ptr = (ubyte*)(bitmap->bm_Buffer
            + (((y >> 1) * bitmap->bm_Width) << 2)
            + ((y & 1) << 1) + (x << 2));
    retvalue = ((Color)ptr[0] << 8) | (Color)ptr[1];
DONE:
    return(retvalue);
}
```

B. Spryte Rendering Routines

As mentioned, the spryte engine 214 renders sprytes in response to "spryte control blocks" (SCoBs) which have been prepared and linked together in a list. The software data structure for a SCoB (also called SCB) is advantageously as follows:

```
/* copyright 1992 The 3DO Company */
/* Definition of spryte data structure */
typedef ulong SpryteData[ ];
/* Definition of spryte control block */
typedef struct SCB
    {
    ulong scb_Flags;
    struct SCB *scb_NextPtr;
    SpryteData *scb_SpryteData;
    void   scb_PIPPtr;
    Coord scb_X;
    Coord scb_Y;
    long scb_HDX;
    long scb_HDY;
    long scb_VDX;
    long scb_VDY;
    long scb_DDX;
    long scb_DDY;
    ulong scb_PPMPC;
    ulong scb_PRE0;
    ulong seb_PRE1;
    } SCB;
```

Once a linked list of SCoBs has been prepared, the following supervisor mode routines may be used to initiate the spryte engine 214:

```
/* copyright 1992 The 3DO Company */
int32
DrawScreenSprytes(Item screenItem, SCB *scb)
/* Draw sprytes into the screen's bitmaps, following the */
/* SCB chain */
    Screen *screen;
    int32 retvalue;
    /* This routine should NOT be in supervisor mode */
    SDEBUG(("DrawScreenSprytes( "));
    SDEBUG(("screenItem=$%lx", (unsigned long)
        (screenItem)));
    SDEBUG(("scb=$%lx", (unsigned long)(scb)));
    SDEBUG((" )\n"));
    screen = (Screen*)CheckItem(screenItem,
        NODE_GRAPHICS, TYPE_SCREEN);
    if (NOT screen)
        {
            retvalue = -1001;
            goto DONE;
        }
    retvalue = DrawSprytes(screen->scr_TempBitmap->
        bm.n_Item, scb);
```

```
        goto DONE;
        retvalue = 0;
DONE:
        return(retvalue);
}
int32
DrawSprytes(Item bitmapItem, SCB *scb)
/* Draw sprytes into the bitmap, following the SCB chain */
{
        int32 retvalue;
        Bitmap *bitmap;
        /* This routine should be in supervisor mode */
        int32 timestamp;
        SDEBUG("DrawSprytes( ");
        SDEBUG(("bitmapItem=$%lx", (unsigned long)
                (bitmapItem)));
        SDEBUG("scb=$%lx", (unsigned long)(scb)));
        SDEBUG(" )\n"));
        bitmap = (Bitmap*)CheckItem(bitmapItem,
                NODE_GRAPHICS, TYPE_BITMAP);
        if (NOT bitmap)
                {
                retvalue = -2111;
                goto DONE;
                }
        timestamp = GrafBase->gf_VBLCount;
        *SCOBCTL0 = bitmap->bm_SCOBCTL0;
        *REGCTL0 = bitmap->bm_REGCTL0;
        *REGCTL1 = bitmap->bm_REGCTL1;
        *REGCTL2 = bitmap->bm_REGCTL2;
        *REGCTL3 = bitmap->bm_REGCTL3;
        *NEXTPTR = (ulong)scb;
        *SPRSTRT = 0;
        while(*STATBits & SPRON)
                {
#ifdef AUTOKILL_SPRITE
                if (GrafBase->gf_VBLCount - timestamp > = 3)
                        {
                        *SPRSTOP = 0;
                        retvalue = -666;
                        goto DONE;
                        }
                else *SPRCNTU = 0;
#else
                *SPRCNTU = 0;
#endif /* #ifdef AUTOKILL_SPRITE */
                }
        retvalue = 0;
DONE:
        return(retvalue);
}
```

As previously mentioned, the spryte engine 214 can map a spryte source image onto a quadrilateral (proper or degenerate) of any shape, given appropriate values in the SCoB for that spryte. The following routine is useful to help users calculate correct values for the scb_X, scb_Y, scb_HDX, scb_HDY, scb_VDX, scb_VDY, scb_DDX and scb_DDY values in a SCoB, given the four points of a destination quadrilateral in the destination buffer.

```
/* copyright 1992 The 3DO Company */
void
MapSpryte(SCB *scb, Point *quad, int32 width, int32 height)
/* Take a spryte and create position and delta values to map
 * its corners onto the specified quadrilateral, whose points
 * define the corners of the quadrilateral in clockwise order
 * starting from top-left.
 */
{
        int32 size;
        /* This routine should be in user mode */
        size = width * height;
        scb->scb_X = ((quad[0].point_X << 16) & 0xffff0000) +
                0x8000;
        scb->scb_Y = ((quad[0].point_Y << 16) & 0xffff0000) +
                0x8000;
        scb->scb_HDX = ((quad[1].point_X - quad[0].
                point_X) << 20)/width;
        scb->scb_HDY = ((quad[1].point_Y - quad[0].
                point_Y) << 20)/width;
        scb->scb_VDX = ((quad[3].point_X - quad[0].
                point_X) << 16)/height;
        scb->scb_VDY = ((quad[3].point_Y - quad[0].
                point_Y) << 16)/height;
        scb->scb_DDX = ((quad[2].point_X - quad[3].
                point_X
                -quad[1].point_X + quad[0].point_X) << 20)/size;
        scb->scb_DDY = ((quad[2].point_Y - quad[3].point_Y
                -quad[1].point_Y + quad[0].point_Y) << 20)/size;
}
```

A wide variety of basic spryte rendering routines may be built on the above primitives. These spryte rendering routines may be written to merely create appropriate SCoBs and link them into a list for subsequent rendering by a routine such as DrawSprites, or they may call the spryte engine 214 directly. Such routines can include routines to draw horizontal or vertical lines with specified endpoints, routines to fill a specified rectangle, and routines to draw a line from the current pen position of a graphics context to a new position. These routines can all operate by creating a SCoB which points to spryte image source data containing a single pixel of the current graphics context foreground color, and setting up appropriate values in scb_X, scb_Y, scb_hdx, scb_hdy, scb_vdx, scb_vdy, scb_ddx and scb_ddy to have the spryte engine 214 expand the pixel to the desired shape. The routine can then either link the SCoB into a list or use a routine like DrawSprytes to call the spryte engine 214 immediately. Advantageously, routines such as these utilize a GrafCon data structure to maintain "current" foreground and background colors, and "current" X and Y pen positions within a destination bitmap. Such a data structure may be defined as follows:

```
/* copyright 1992 The 3DO Company */
/* Graphics Context structure */
typedef struct GrafCon
        {
        Node gc;
        Color gc_FGPen;
        Color gc_BGPen;
        Coord gc_PenX;
        Coord gc_PenY;
        ulong gc_Flags;
        } GrafCon;
```

Using the GrafCon structure, the following is an example of a routine that uses DrawSprytes to call the spryte engine 214 to draw a line in a specified bitmap.

```
/* copyright 1992 The 3DO Company */
/* A routine that draws a line to a Bitmap, using a Graphics */
/* Context */
int32
DrawTo(Item bitmapItem, GrafCon *gc, Coord x, Coord y)
{
        SCB scb;
        int32 sprytedata[3];
        Coord adx;
        int32 oldx, oldy;
        /* This routine doesn't need to be in supervisor mode */
        oldx = gc->gc_PenX;
        oldy = gc->gc_PenY;
        gc->gc_PenX = x;
        gc->gc_PenY = y;
```

```
/* Set up a data buffer to look like a literal sprite */
sprytedata[0] = ((1 - 1) << PRE0_VCNT_SHIFT) |
PRE0_LINEAR | PRE0_BPP_16;
sprytedata[1] = ((1 - 1) << PRE1_TLHPCNT_SHFT)
        | (0 << PRE1_WOFFSET10_SHFT);
/* Put the foreground color into the literal data */
sprytedata[2] = gc->gc_FGPen << 16;
/* Set up the sprite control block to refer to this type of */
/* sprite */
scb.scb_Flags = SCB_ACW | SCB_ACCW |
SCB_LAST | SCB_SPABS
        | SCB_ACE | SCB_BGND |
        SCB_NOBLK | SCB_LDSIZE |
        SCB_YOXY | SCB_LDPPMP |
        SCB_LDPRS;
scb.scb_PPMPC = (PPMP_MODE_NORMAL <<
PPMP_0_SHIFT)
        | (PPMP_MODE_NORMAL <<
        PPMP_1_SHIFT);
scb.scb_SpryteData = (SpryteData *)(&sprytedata);
scb.scb_DDX = 0;
scb.scb_DDY = 0;
if (y > = oldy)
    {
    scb.scb_X = oldx << 16;
    scb.scb_VDX = (x << 16) - scb.scb_X;
    scb.scb_Y = oldy << 16;
    scb.scb_VDY = (y << 16) - scb.scb_Y;
    }
else
    {
    scb.scb_X = x << 16;
    scb.scb_VDX = (oldx << 16) - scb.scb_X;
    scb.scb_Y = y << 16;
    scb.scb_VDY = (oldy << 16) - scb.scb_Y;
    }
if (scb.scb_VDX > = 0) adx = scb.scb_VDX;
else adx = -scb.scb_VDX;
if (adx > = scb.scb_VDY)
    {
    scb.scb_HDX = 0;
    scb.scb_HDY = (-1) << 20;
    scb.scb_VDY + = (1 << 16);
    if (scb.scb_VDX > = 0)
        scb.scb_VDX + = (1 << 16);
    else
        {
        scb.scb_VDX - = (1 << 16);
        scb.scb_X + = (1 << 16);
        }
    }
else
    {
    scb.scb_HDX = 1 << 20;
    scb.scb_HDY = 0;
    if (scb.scb_VDX > = 0) scb.scb_VDX + =
    (1 << 16);
    else scb.scb_VDX - = (1 << 16);
    scb.scb_VDY + = (1 << 16);
    }
return(DrawSprytes(bitmapItem, &scb));
}
```

The invention has been described with respect to particular embodiments thereof, and numerous modifications may be made without departing from its scope.

We claim:

1. A method for rendering a graphical image into a destination buffer, comprising the steps of:

preparing a linked list of control blocks in a memory, each control block carrying rendering information for a corresponding sub-image;

writing a value into a first control register (REGCTL2) indicating a base address in said memory of an additional image portion;

writing a value into a second control register (REGCTL3) indicating a base address in said memory of said destination buffer; and causing a graphics manipulation processor to render said sub-images into the destination buffer identified by the value in said second control register (REGCTL3), in response to sequential ones of said control blocks in said linked list, and in combination with the additional image portion identified by the value in said first control register (REGCTL2).

2. A method according to claim 1, wherein each of said control blocks is arranged contiguously in said memory.

3. A method according to claim 1, wherein said step of preparing a linked list of control blocks comprises the step of writing into one of said control blocks, a pointer to sub-image source data in said memory for use by said processor to render the sub-image corresponding to said one control block.

4. A method according to claim 3, wherein said step of preparing a linked list of control blocks further comprises the step of writing to the beginning of said sub-image source data in said memory, an indication of which of a plurality of available data compression formats is used in said sub-image source data in said memory.

5. A method according to claim 1, wherein said step of preparing a linked list of control blocks comprises the step of writing into one of said control blocks, a pointer to a data translation table for use by said processor to translate pixel color values in sub-image source data corresponding to said one control block.

6. A method according to claim 1, wherein said step of preparing a linked list of control blocks comprises the step of writing into one of said control blocks, a plurality of flag bits for use by said processor to process sub-image source data corresponding to said one control block.

7. A method according to claim 1, wherein said step of preparing a linked list of control blocks comprises the step of writing into one of said control blocks, an indication of starting coordinates in said destination buffer at which said processor is to begin rendering sub-image source data corresponding to said one control block.

8. A method according to claim 1, wherein said step of preparing a linked list of control blocks comprises the step of writing into one of said control blocks, an indication of a number, DX and DY respectively, of horizontal and vertical pixels in said destination buffer by which said processor is to increment for each pixel rendered along a first line of sub-image source data corresponding to said one control block.

9. A method according to claim 8, wherein said step of preparing a linked list of control blocks further comprises the step of writing into said one control block, an indication of a number of horizontal and vertical pixels in said destination buffer by which said processor is to increment said values DX and DY, respectively, for each line rendered of said sub-image source data corresponding to said one control block.

10. A method according to claim 1, wherein said step of preparing a linked list of control blocks comprises the step of writing into one of said control blocks, an indication of a number of horizontal and vertical pixels in said destination buffer by which said processor is to increment starting coordinates in said destination buffer at which said processor is to begin rendering a second line of sub-image source data corresponding to one of said control blocks, relative to starting coordinates in said destination buffer at which said processor is to begin rendering a first line of sub-image source data corresponding to said one control block.

11. A method according to claim 1, wherein said step of preparing a linked list of control blocks comprises the step of writing into one of said control blocks, an indication of which of a plurality of available data compression formats is used in sub-image source data corresponding to said one control block.

12. A method according to claim 1, further comprising the step of writing a value to a control register (REGCTL0) indicating the number of pixels which said processor should consider as defining a scan line in said destination buffer.

13. A method according to claim 1,
further comprising the step of writing a value to a control register (REGCTL0) indicating the number of pixels which said processor should consider as defining a scan line in said additional image portion.

14. A method according to claim 1, further comprising the step of writing a horizontal clip value to a control register (REGCTL1), indicating to said processor that no destination pixels horizontally beyond said horizontal clip value need be rendered.

15. A method according to claim 1, further comprising the step of writing a vertical clip value to a control register (REGCTL1), indicating to said processor that no destination pixels vertically beyond said vertical clip value need be rendered.

16. A method according to any of claims 1, 3, 5, 8–11, and 12, further comprising the step of displaying as a single image, the sub-images rendered into said destination buffer.

17. A system having a destination buffer containing data generated by the method of any of claims 1, 2–13, and 14–15.

18. A method for rendering a graphical image into a display buffer, comprising the steps of:
preparing a linked list of control blocks in a memory, each carrying rendering information for a corresponding sub-image;
writing a value into a first control register (REGCTL2) indicating a base address in said memory of an additional image portion;
writing a value into a second control register (REGCTL3) indicating a base address in said memory of said destination buffer; and
causing a graphics manipulation processor to begin sub-image rendering steps in response to sequential ones of said control blocks, said processor combining one of said sub-images with the additional image portion identified in said first control register (REGCTL2) in rendering said one sub-image into the destination buffer identified in said second control register (REGCTL3).

19. A system having a display buffer containing data generated by the method of claim 18.

20. A computer-readable medium, for use with a CPU, a graphics manipulation processor and a memory, said computer-readable medium having stored thereon:
first computer instructions, which when executed by said CPU, prepare a linked list of control blocks in said memory, each control block carrying rendering information for a corresponding sub-image;
second computer instructions, which when executed by said CPU, write a value into a first control register (REGCTL2) indicating a base address in said memory of an additional image portion;
third computer instructions, which when executed by said CPU, write a value into a second control register (REGCTL3) indicating a base address in said memory of a destination buffer; and
fourth computer instructions, which when executed by said CPU, cause said graphics manipulation processor to render said sub-images into the destination buffer identified in said second control register (REGCTL3), in response to sequential ones of said control blocks in said linked list, and to combine one of said sub-images with the additional image portion identified in said first control register (REGCTL2) in rendering said one sub-image into said destination buffer.

21. A medium according to claim 20, wherein said first computer instructions arrange said control blocks contiguously in said memory.

22. A medium according to claim 20, wherein said first computer instructions further write into one of said control blocks, a pointer to sub-image source data in said memory for use by said processor to render the sub-image corresponding to said one control block.

23. A medium according to claim 22, wherein said first computer instructions further write to the beginning of said sub-image source data in said memory, an indication of which of a plurality of available data compression formats is used in said sub-image source data in said memory.

24. A medium according to claim 20, wherein said first computer instructions further write into one of said control blocks, a pointer to a data translation table for use by said processor to translate pixel color values in sub-image source data corresponding to said one control block.

25. A medium according to claim 20, wherein said first computer instructions further write into one of said control blocks, a plurality of flag bits for use by said processor to process sub-image source data corresponding to said one control block.

26. A medium according to claim 20, wherein said first computer instructions further write into one of said control blocks, an indication of starting coordinates in said destination buffer at which said processor is to begin rendering sub-image source data corresponding to said one control block.

27. A medium according to claim 20, wherein said first computer instructions further write into one of said control blocks, an indication of a number, DX and DY respectively, of horizontal and vertical pixels in said destination buffer by which said processor is to increment for each pixel rendered along a first line of sub-image source data corresponding to said one control block.

28. A medium according to claim 27, wherein said first computer instructions further write into said one control block, an indication of a number of horizontal and vertical pixels in said destination buffer by which said processor is to increment said values DX and DY, respectively, for each line rendered of said sub-image source data corresponding to said one control block.

29. A medium according to claim 20, wherein said first computer instructions further write into one of said control blocks, an indication of a number of horizontal and vertical pixels in said destination buffer by which said processor is to increment starting coordinates in said destination buffer at which said processor is to begin rendering a second line of sub-image source data corresponding to one of said control blocks, relative to starting coordinates in said destination buffer at which said processor is to begin rendering a first line of sub-image source data corresponding to said one control block.

30. A medium according to claim 20, wherein said first computer instructions further write into one of said control blocks, an indication of which of a plurality of available data compression formats is used in sub-image source data corresponding to said one control block.

31. A medium according to claim 20, having further stored thereon additional computer instructions, which when executed by said CPU, write a value to a control register (REGCTL0) indicating the number of pixels which said processor should consider as defining a scan line in said destination buffer.

32. A medium according to claim 20, having further stored thereon additional computer instructions, which when executed by said CPU, write a value to a control register (REGCTL0) indicating the number of pixels which said processor should consider as defining a scan line in said additional image portion.

33. A medium according to claim 20, having further stored thereon additional computer instructions, which when executed by said CPU, write a horizontal clip value to a control register (REGCTL1), indicating to said processor that no destination pixels horizontally beyond said horizontal clip value need be rendered.

34. A medium according to claim 20, having further stored thereon additional computer instructions, which when executed by said CPU, write a vertical clip value to a control register (REGCTL1), indicating to said processor that no destination pixels vertically beyond said vertical clip value need be rendered.

* * * * *